(12) United States Patent
Burch

(10) Patent No.: US 11,567,534 B2
(45) Date of Patent: Jan. 31, 2023

(54) WEARABLE DEVICES FOR COURIER PROCESSING AND METHODS OF USE THEREOF

(71) Applicant: FEDERAL EXPRESS CORPORATION, Memphis, TN (US)

(72) Inventor: Reuben F. Burch, Rossville, TN (US)

(73) Assignee: Federal Express Corporation, Memphis, TN (US)

( * ) Notice: Subject to any disclaimer, the term of this patent is extended or adjusted under 35 U.S.C. 154(b) by 0 days.

(21) Appl. No.: 17/657,461

(22) Filed: Mar. 31, 2022

(65) Prior Publication Data

US 2022/0221900 A1     Jul. 14, 2022

Related U.S. Application Data

(63) Continuation of application No. 16/267,342, filed on Feb. 4, 2019, now Pat. No. 11,320,858, which is a
(Continued)

(51) Int. Cl.
*G06F 1/16* (2006.01)
*G06F 3/042* (2006.01)
(Continued)

(52) U.S. Cl.
CPC ............ *G06F 1/163* (2013.01); *G06F 1/1686* (2013.01); *G06F 1/1696* (2013.01); *G06F 3/017* (2013.01);
(Continued)

(58) Field of Classification Search
CPC ...... G06F 1/163; G06F 1/1686; G06F 1/1696; G06F 3/017; G06F 3/0425;
(Continued)

(56) References Cited

U.S. PATENT DOCUMENTS

| | | | |
|---|---|---|---|
| 4,766,299 A | 8/1988 | Tierney | |
| 5,191,197 A | 3/1993 | Metlitsky | |

(Continued)

FOREIGN PATENT DOCUMENTS

| | | |
|---|---|---|
| JP | 2000-148381 | 5/2000 |
| JP | 2000-215267 | 8/2000 |

(Continued)

OTHER PUBLICATIONS

Extended European Search report dated Nov. 26, 2020, issued in corresponding European Application No. EP 20187994. 7 (5 pages).

(Continued)

*Primary Examiner* — Michael J Jansen, II
(74) *Attorney, Agent, or Firm* — Finnegan, Henderson, Farabow, Garrett & Dunner, LLP

(57) ABSTRACT

The disclosed embodiments include wearable devices and methods for performing courier services. In one implementation, the device includes a depth camera for detecting object depths in a field of view, a scanner for decoding visual codes, a speaker for producing audible sounds in response to an electrical signal, memory, and a processor. The processor may execute instructions to detect a scanning event based on a first signal received from the depth camera, determine a scan region associated with the scanning event, provide a second signal to the scanner causing the scanner to decode a visual code located within the scan region, generate scan data based on a third signal received from the scanner, and provide a fourth signal to the speaker causing the speaker to emit a notification sound. The wearable device may also capture signatures, dimension objects, and disable device functions based on time and place restrictions.

20 Claims, 15 Drawing Sheets

Related U.S. Application Data continuation of application No. 14/713,983, filed on May 15, 2015, now Pat. No. 10,198,030.

(60) Provisional application No. 61/993,868, filed on May 15, 2014.

(51) Int. Cl.
  *G06F 3/01* (2006.01)
  *G06K 7/10* (2006.01)

(52) U.S. Cl.
  CPC ....... *G06F 3/0425* (2013.01); *G06K 7/10821* (2013.01); *G06K 7/10801* (2013.01); *G06K 2007/10504* (2013.01)

(58) Field of Classification Search
  CPC ......... G06F 2203/04106; G06F 3/0488; G06F 3/0304; G06K 7/10821; G06K 7/10801; G06K 2007/10504
  See application file for complete search history.

(56) References Cited

U.S. PATENT DOCUMENTS

| | | |
|---|---|---|
| 5,340,972 A | 8/1994 | Sandor |
| 5,543,610 A | 8/1996 | Bard |
| 5,587,577 A | 12/1996 | Schultz |
| 5,614,706 A | 3/1997 | Bard |
| 5,793,032 A | 8/1998 | Bard |
| 5,898,161 A | 4/1999 | DeVita |
| 5,986,446 A | 11/1999 | Williamson |
| 6,010,071 A | 1/2000 | Bard |
| 6,145,746 A | 11/2000 | Bard |
| 6,202,930 B1 | 3/2001 | Plesko |
| 6,764,012 B2 | 7/2004 | Connolly |
| 6,771,294 B1 | 8/2004 | Pulli |
| 6,814,293 B2 | 11/2004 | Curry |
| 6,832,724 B2 | 12/2004 | Yavid |
| 7,109,460 B2 | 9/2006 | Diamantstein |
| 7,185,818 B2 | 3/2007 | Salvato |
| 7,389,933 B2 | 6/2008 | Wang |
| 7,726,576 B2 | 6/2010 | Salvato |
| 7,841,533 B2 | 11/2010 | Kotlarsky |
| 7,913,912 B2 | 3/2011 | Do |
| 7,942,326 B2 | 5/2011 | Miller |
| 8,179,563 B2 | 5/2012 | King |
| 8,228,202 B2 | 7/2012 | Buchner |
| 8,255,500 B2 | 8/2012 | Cacheria, III |
| 8,289,162 B2 | 10/2012 | Mooring |
| 8,292,184 B2 | 10/2012 | Turbovich |
| 8,421,634 B2 | 4/2013 | Tan |
| 8,458,363 B2 | 6/2013 | Rosenblatt |
| 8,471,868 B1 | 6/2013 | Wilson |
| 8,490,176 B2 | 7/2013 | Book |
| 8,490,877 B2 | 7/2013 | Kearney |
| 8,516,125 B2 | 8/2013 | Rosenblatt |
| 8,520,836 B2 | 8/2013 | Johnston |
| 8,523,068 B2 | 9/2013 | Hsu |
| 8,674,810 B2 | 3/2014 | Uysal |
| 8,723,787 B2 | 5/2014 | Jung |
| 8,743,079 B2 | 6/2014 | Norieda |
| 8,851,372 B2 | 10/2014 | Zhou |
| 8,972,283 B2 | 3/2015 | Hicks |
| 9,069,164 B2 | 6/2015 | Starner |
| 9,092,684 B1 | 7/2015 | Sundaram |
| 9,130,802 B2 | 9/2015 | Rosenblatt |
| 9,151,953 B2 | 10/2015 | Qaddoura |
| 9,153,074 B2 | 10/2015 | Zhou |
| 9,261,979 B2 | 2/2016 | Shamaie |
| 9,569,001 B2 | 2/2017 | Mistry |
| 9,569,652 B2 | 2/2017 | Kearney |
| 9,582,035 B2 | 2/2017 | Connor |
| 9,606,721 B2 | 3/2017 | Park |
| 9,651,991 B2 | 5/2017 | Kim |
| 9,690,376 B2 | 6/2017 | Davis |
| 9,836,128 B2 | 12/2017 | Eun |
| 9,910,501 B2 | 3/2018 | Chirakan |
| 10,019,149 B2 | 7/2018 | Chirakan |
| 10,061,387 B2 | 8/2018 | Toney |
| 10,067,610 B2 | 9/2018 | Kim |
| 10,198,030 B2 | 2/2019 | Burch |
| 10,216,284 B2 | 2/2019 | Chirakan |
| 11,320,858 B2 * | 5/2022 | Burch .................. G06F 1/1696 |
| 2002/0017567 A1 | 2/2002 | Connolly |
| 2002/0030094 A1 | 3/2002 | Curry |
| 2002/0125324 A1 | 9/2002 | Yavid |
| 2004/0070563 A1 | 4/2004 | Robinson |
| 2004/0129903 A1 | 7/2004 | Diamantstein |
| 2005/0113167 A1 | 5/2005 | Buchner |
| 2005/0132290 A1 | 6/2005 | Buchner |
| 2005/0139679 A1 | 6/2005 | Salvato |
| 2007/0138290 A1 | 6/2007 | Salvato |
| 2008/0024961 A1 | 1/2008 | Anderson et al. |
| 2008/0044005 A1 | 2/2008 | Johnston |
| 2008/0087734 A1 | 4/2008 | Wang |
| 2008/0113814 A1 | 5/2008 | Osburn |
| 2008/0164312 A1 | 7/2008 | Do |
| 2008/0197195 A1 | 8/2008 | Miller |
| 2008/0314985 A1 | 12/2008 | Kotlarsky |
| 2009/0051648 A1 | 2/2009 | Shamaie |
| 2009/0276439 A1 | 11/2009 | Rosenblatt |
| 2009/0276547 A1 | 11/2009 | Rosenblatt et al. |
| 2009/0324138 A1 | 12/2009 | Jung |
| 2010/0156676 A1 | 6/2010 | Mooring |
| 2010/0179990 A1 | 7/2010 | Cacheria, III |
| 2010/0199232 A1 | 8/2010 | Mistry |
| 2010/0271187 A1 | 10/2010 | Uysal |
| 2011/0065419 A1 | 3/2011 | Book |
| 2011/0133934 A1 | 6/2011 | Tan |
| 2011/0134074 A1 | 6/2011 | Norieda |
| 2011/0136515 A1 | 6/2011 | Hata |
| 2011/0242617 A1 | 10/2011 | King |
| 2012/0111945 A1 | 5/2012 | Kearney |
| 2012/0223143 A1 | 9/2012 | Turbovich |
| 2012/0249409 A1 | 10/2012 | Toney |
| 2012/0298740 A1 | 11/2012 | Hsu |
| 2013/0016070 A1 | 1/2013 | Starner |
| 2013/0086531 A1 | 4/2013 | Sugita |
| 2013/0287258 A1 | 10/2013 | Kearney |
| 2013/0311602 A1 | 11/2013 | Rosenblatt |
| 2013/0329013 A1 | 12/2013 | Metois et al. |
| 2013/0346168 A1 | 12/2013 | Zhou et al. |
| 2014/0055352 A1 | 2/2014 | Davis |
| 2014/0125580 A1 | 5/2014 | Eun |
| 2014/0239065 A1 | 8/2014 | Zhou |
| 2014/0249944 A1 | 9/2014 | Hicks |
| 2014/0337621 A1 | 11/2014 | Nakhimov |
| 2014/0347295 A1 | 11/2014 | Kim |
| 2015/0026647 A1 | 1/2015 | Park |
| 2015/0054730 A1 | 2/2015 | Kodama |
| 2015/0138699 A1 | 5/2015 | Yamazaki |
| 2015/0168727 A1 | 6/2015 | Qaddoura |
| 2015/0192999 A1 | 7/2015 | Chirakan |
| 2015/0193115 A1 | 7/2015 | Chirakan |
| 2015/0309535 A1 | 10/2015 | Connor |
| 2015/0332075 A1 | 11/2015 | Burch |
| 2016/0147376 A1 | 5/2016 | Kim |
| 2016/0171417 A1 | 6/2016 | Sankaralingham |
| 2017/0169503 A1 | 6/2017 | Chirakan |
| 2019/0171250 A1 | 6/2019 | Burch |

FOREIGN PATENT DOCUMENTS

| | | |
|---|---|---|
| JP | 2010-45461 | 2/2010 |
| JP | 2012-119627 | 6/2012 |
| JP | 2013-97408 | 5/2013 |

OTHER PUBLICATIONS

Notice of Reasons for Rejection dated Jan. 8, 2019, issued in corresponding Japanese Application No. 2016-567629.

* cited by examiner

WEARABLE DEVICES FOR COURIER PROCESSING AND METHODS OF USE THEREOF

CROSS-REFERENCE TO RELATED APPLICATIONS

This application is a continuation of U.S. patent application Ser. No. 16/267,342, filed on Feb. 4, 2019, which is a continuation of U.S. patent application Ser. No. 14/713,983, filed on May 15, 2015, now U.S. Pat. No. 10,198,030, which claims the benefit of priority to U.S. Provisional Patent Application No. 61/993,868, titled "Wearable Device for Symbiotic Interaction," filed May 15, 2014, the entire contents of all of which are expressly incorporated herein by reference.

BACKGROUND

Technical Field

The disclosed embodiments generally relate to wearable devices for processing information, and more particularly, and without limitation, to wearable devices for processing information associated with courier services.

Background

In today's digital world, technology plays an important role in gathering and processing data. In the courier and common carrier industries, for instance, users and entities benefit from tracking packages with handheld scanners and readers. Such mechanisms, however, are cumbersome for users and often require using a hand or arm to conduct the necessary processing. Such mechanisms may also reduce productivity and may also require additional adjunct devices such as standalone scanners, card readers, imagers, cameras, displays, and the like.

SUMMARY

The disclosed embodiments include a wearable device for processing information and methods of the use thereof. The disclosed embodiments may enable couriers and other device users to conduct certain processes (e.g., courier services and functions) without the use of a handheld tool.

The disclosed embodiments include, for example, a wearable device for performing courier services. In some aspects, the device includes a depth camera for detecting object depths in a field of view, a scanner for decoding visual codes, a speaker for producing audible sounds in response to an electrical signal, a memory for storing instructions, and one or more processors communicatively connected to the depth camera, scanner, and speaker, the one or more processors configured to execute the instructions to perform one or more operations. The operations include detecting a scanning event based on a first signal received from the depth camera, the scanning event comprising a gesture input performed in proximity to a first surface. The operations also include determining a scan region associated with the scanning event based on a location and depth of the gesture input. The operations also include providing a second signal to the scanner causing the scanner to decode a visual code located within the scan region. The operations also include generating scan data based on a third signal received from the scanner, the third signal reflecting information obtained from the visual code. The operations also include providing a fourth signal to the speaker causing the speaker to emit a notification sound in response to generating the scan data.

The disclosed embodiments also include, for example, a computer-implemented method for performing courier services using a wearable electronic device, the wearable electronic device comprising a depth camera for detecting object depths in a field of view, a scanner for decoding visual codes, a speaker for producing audible sounds in response to an electrical signal, and a connector facilitating wearing the device around an upper portion of a human arm, such that the device has a substantially elliptical cross section when worn, the method comprising the one or more operations perform on one or more processors. The operations include detecting a scanning event based on a first signal received from the depth camera, the scanning event comprising a gesture input performed in proximity to a first surface. The operations also include determining a scan region associated with the scanning event based on a location and depth of the gesture input. The operations also include providing a second signal to the scanner causing the scanner to decode a visual code located within the scan region. The operations also include generating scan data based on a third signal received from the scanner, the third signal reflecting information obtained from the visual code. The operations also include providing a fourth signal to the speaker causing the speaker to emit a notification sound in response to generating the scan data.

Additional features and advantages of the disclosed embodiments will be set forth in part in the description that follows, and in part will be obvious from the description, or may be learned by practice of the disclosed embodiments. The features and advantages of the disclosed embodiments will be realized and attained by means of the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

The disclosed embodiments include devices, apparatuses, systems, and methods for performing information processing in hands-free or near hands-free environments. The disclosed embodiments may enable couriers and other device users to conduct certain processes (e.g., courier services and functions) without the use of a handheld tool. For example, wearable devices as disclosed herein may processes information such as scanning barcodes, accepting signatures, monitoring users, providing notifications, modeling environments, and other processing, all without holding a physical device in one's hand. Aspects of the disclosed embodiments may also provide personalize and ruggedize the device for use in a variety of environments and for a variety of users.

In some aspects, wearable devices consistent with the disclosed embodiments may provide one or more technical advantages. In some aspects, the devices may enable couriers and other users to perform courier services and other functions without the use of a handheld device. This may allow users to make a second hand available for other uses, such as lifting objects, carrying packages, signing documents, operating a vehicle, etc. In addition, the use of a second hand may improve courier productivity and provide health benefits, such as enabling users to carry packages with both hands, carry additional packages, and so on. Moreover, aspects of the disclosed embodiments may combine the functionalities of several such handheld devices, thereby reducing the number of devices or components necessary for completing certain tasks. Wearable devices consistent with the disclosed embodiments may also permit personalizing and customizing the device appearance and functionality, thereby accommodating a wide range of users and addressing other concerns such as user hygiene. Other improvements will be apparent to one of ordinary skill in the art in light of the disclosed embodiments, and the listing of certain advantages above is merely for illustrative purposes.

Reference will now be made in detail to embodiments, examples of which are illustrated in the accompanying drawings. Wherever possible, the same reference numbers will be used throughout the drawings to refer to the same or like parts. Moreover, while certain features may be described in connection with "the device," it should be understood from the context that these features may be implemented via a device component capable of performing that function, including hardware and/or software instructions executed on the device.

Figure 1:
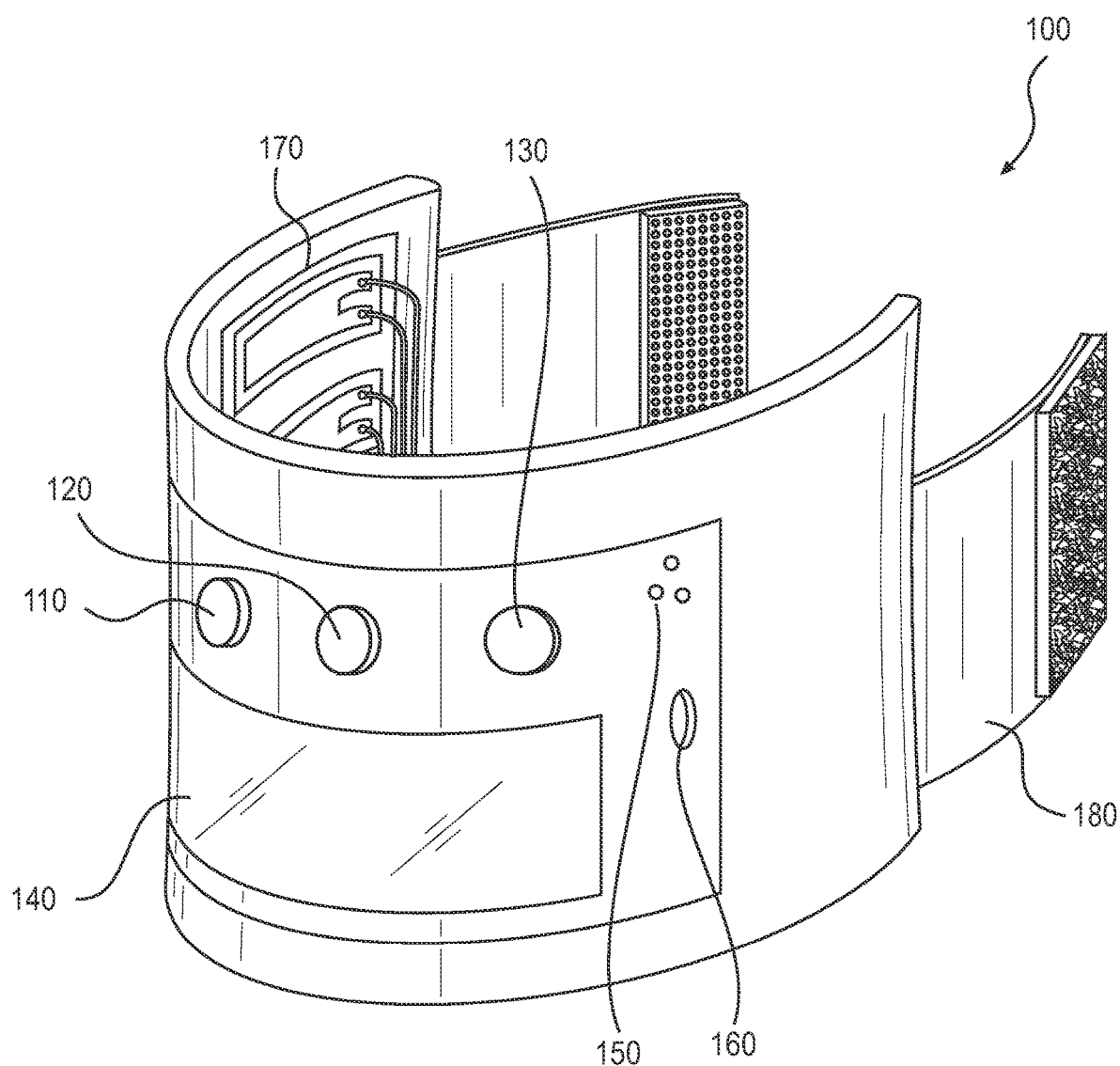
FIG. 1 depicts an example wearable processing device consistent with the disclosed embodiments.

FIG. 1 depicts an example wearable processing device 100 consistent with the disclosed embodiments. Device 100 comprises a wearable device capable of portraying, receiving, obtaining, gathering, processing, transmitting, and displaying information. In certain embodiments, device 100 may a depth-sensing, data-gathering, image projection system facilitating interactive, multitouch, gesture, or audial applications in a variety of fields for use in processes consistent with the disclosed embodiments. As described below, device 100 may conduct processes consistent with the disclosed embodiments in response to one or more input events.

Device 100 may include one or more projectors 110 configured to project or display an image, video, text, interface, or other information onto a surface consistent with the disclosed embodiments. In certain aspects, projector 110 may include a pico projector (e.g., a Microvision pico projector) capable of projecting an image, video, text, etc. onto the surface using any method known to those of ordinary skill in the art (e.g., DLP, LCoS, laser-beam-steering, etc.) and as disclosed herein. The surface may include any area such as a screen, wall, table, human body part (e.g., an arm, hand, leg, etc.), held surface (e.g., a notepad, paper, book, etc.), vehicle, table, box, floor, mirror, window, or any other area sufficiently flat enough to meaningfully convey the image, video, or other information projected with projector 110. In some embodiments, the surface may include a plurality of surfaces (e.g., a hand, a desk, and a wall, etc.). Projector 110 may provide a focus-free, wide-angle projection of pictorial or graphical elements regardless of the distance to the surface (e.g., the distance from projector 110). As described below, device 100 may include hardware and software components (e.g., circuitry, software instructions, etc.) to transfer signals and information to and from projector 100 to conduct processes consistent with the disclosed embodiments (e.g., displaying interfaces, etc.).

In certain embodiments, device 100 may include one or more scanners 120 for scanning, decoding, reading, sensing, imaging, capturing, and/or interpreting visual codes consistent with the disclosed embodiments. In some aspects, scanner 120 may be configured to process laser, linear, or area imaging. For example, in one aspect, scanner 120 may include an imager for scanning, reading, and decoding one-dimensional or two-dimensional barcodes (e.g., a Cognex, Intermec, or Unitech 2D Imager, or any 2D imager). Scanner 120 may include any imager, barcode scanner, or visual code scanner capable of extracting information from visual codes consistent with the disclosed embodiments. In some embodiments, scanner 120 may be mechanically coupled to or include a joint, swivel, rotatable lens, pivot, wheel, or other orientation means, etc. so that device 100 may orient scanner 120 to point in various directions. In certain aspects, the disclosed embodiments enable device 100 to process scanned barcodes, images, and other data via scanner 120. Device 100 may include appropriate hardware and software components (e.g., circuitry, software instructions, etc.) for transmitting signals and information to and from scanner 120 to conduct processes consistent with the disclosed embodiments.

Device 100 may include one or more depth cameras 130 for capturing, processing, sensing, observing, modeling, detecting, and interacting with three-dimensional environments. In certain aspects, depth camera 130 may recognize and detect depths and colors of objects in its field of view (e.g., consistent with the embodiments described in connection with FIGS. 5A and 5B). Depth camera 130 may also provide other camera and video recorder functionalities, such as taking pictures, recording videos, streaming images or other data, storing data in image buffers, etc. These functionalities may or may not include depth information. In connection with hardware and/or software processes consistent with the disclosed embodiments, device 100 may determine sizes, orientations, and visual properties of objects via depth camera 130. Aspects consistent with the disclosed embodiments may also enable device 100 to recognize and process gestures and other interactions using depth camera 130. Depth camera 130 may include or embody any depth camera known to one of ordinary skill in the art (e.g., a depth camera from PrimeSense, SoftKinetic, Creative, etc.) capable of handling the processes disclosed herein. Device 100 may include appropriate hardware and software components (e.g., circuitry, software instructions, etc.) for transmitting signals and information to and from depth camera 130 to conduct processes consistent with the disclosed embodiments (e.g., dimensioning objects, determining surface depths and orientation, etc.). As described below, depth camera 130 may detect several types of input events such as gesture inputs (e.g., bodily movements) and interface inputs (e.g., interactions with an interface projected via projector 110).

Device 100 may include one or more displays 140 for portraying, conveying, and displaying information. Display 140 may include any digital display (e.g., a monochrome display, an LCD display, an LED display, 2D display, spectroscopic 3D display, etc.) capable of presenting or providing information such as text, images, videos, interfaces, and the like. In some aspects, display 140 may also include a touchscreen display. In these embodiments, device 100 may receive display inputs from a user via a touchscreen interface displayed on display 140. Display inputs received via display 140 may be used in device 140 to conduct processes consistent with the disclosed embodiments. Device 140 may include appropriate hardware and software components (e.g., circuitry, software instructions, etc.) for transferring signals and information to and from display 140 conducting processes consistent with the disclosed embodiments.

In some aspects, device 100 may include one or more speakers 150 for producing sound or audial signals for use in processes consistent with the disclosed embodiments. For example, speaker 150 may include or operate in connection with an electroacoustic transducer producing audible sound in response to an electrical audio signal input. Speaker 150 may be configured to generate audial output by any processes known to one of ordinary skill in the art (e.g., electromagnetic inductance, etc.). Alternatively or additionally, device 100 may be equipped with an audio jack to support an audio headset. Audio may include audio information received via a Bluetooth device, or audio signals received over other audio communication pathways (e.g., RF links, public switched telephone networks, etc.) consistent with the disclosed embodiments. Device 100 may include appropriate hardware and software (e.g., circuitry and software instructions) for transferring signals and information to and from speaker 150.

Device 100 may include one or more microphones 160 for converting sound to electrical signals (e.g., as an acoustic-to-electric transducer or other sensor) for use in processes consistent with the disclosed embodiments. Microphone 160 may be configured to generate an electrical signal in response to ambient acoustics through processes known to one of skill in the art (e.g., electromagnetic induction, capacitance change, piezoelectric generation, fiber optics, etc.). In some embodiments, microphone 160 may electrically communicate with a preamplifier, although such a configuration is not required. As described below, device 100 include the necessary hardware or software to transfer electrical signals to and from microphone 160 to conduct processes consistent with the disclosed embodiments (e.g., receive audio input as an input event, record and save audio data, etc.).

In certain embodiments, device 100 may include one or more bioacoustic sensors 170 configured to receive, capture, process, and interpret bioacoustic information. In some aspects, bioacoustic information may include acoustics (e.g., vibrations) in and on a living subject produced upon skin-to-skin contact (e.g., when a finger taps an arm, a palm, another finger, etc.), bodily movements (e.g., making a fist), or other body stimuli. In some embodiments, bioacoustic sensor 170 may comprise a single sensor or an array of sensors, as depicted in FIG. 1. For example, in one embodiment, bioacoustic sensor 170 may comprise an array of piezo films (e.g., MiniSense 100, other cantilever-type vibration sensors, etc.) designed to detect vibrations throughout a human body. Device 100 may include appropriate hardware and software components (e.g., circuitry, software instructions, etc.) for transferring signals and information to and from bioacoustics sensor 170 to conduct processes consistent with the disclosed embodiments. As described below, bioacoustics sensor 170 may assist in the detection of certain types of input events, such as gesture inputs.

In some embodiments, device 100 may include a strap, band, frame, or other such connector 180 configured to facilitate wearing device 100. In some aspects, connector 180 may be rigid or adjustable to accommodate users of different body types (e.g., via an elastic strap, adjustable band, bendable frame, etc.). Additionally or alternatively, connector 180 and may include fastening means (e.g., one or more Velcro regions, hooks, belts, buckles, clasps, buttons, drawstrings, etc.) to secure the connector 180 or device 100. In some aspects, connector 180 may be designed so that device 100 rests comfortably on a particular portion of the human body when worn, such as the upper portion of an arm. For example, connector 180 may include a band or strap such that, while device 100 is worn (e.g., the connector 180 is in a connected state), the device exhibits a substantially elliptical cross section. In some aspects, connector 180 may always be in a connected state (e.g., the connector is an adjustable band), while in others, connector 180 may be in a connected state only when capable of being reliably worn (e.g., the connector is a patch of Velcro). In certain embodiments, connector 180 may break away, disengage, or adjust when a certain amount of pressure is applied. For example, in one aspect, connector 180 may disengage when caught in an object (e.g., a conveyor belt, a door, etc.). Connector 180 may also be removable from device 100 so that different types of connectors may be installed (e.g., due to user body types, user preferences, stronger fits, working requirements, etc.).

While FIG. 1 depicts certain device components included in device 100, the device may include other components, omit depicted components, include multiple instances of the same component, and/or combine some but not all illustrated components. For example, in one illustrative aspect, device 100 may not include a speaker 150, microphone 160, or connector 180. In addition, device 100 may include other components not shown in FIG. 1. For example, device 100 may include components such as such as an accelerometer, GPS receiver, vibration motor, radio link, SIM card, RFID chip, audio jacks, Bluetooth system, connector ports (e.g., USB, Lightning, DVI, HDMI, any I/O port, etc.), biometric scanners, physical buttons (e.g., volume buttons, silence buttons, buttons for providing other input, buttons associated with display 140, etc.), keyboards, stylus holders, camera, card readers, or any other kind of component capable of receiving, processing, or generating information, and/or facilitating informational exchange. In yet another example, device 100 may include several depth cameras 130 to conduct additional processes consistent with the disclosed embodiments (e.g., by generating parallax information from the depth data associated with several viewpoints). Device 100 may include the necessary peripherals, circuitry, wiring, receivers, software instructions, etc. necessary to implement these devices.

In some aspects, device 100 may include components combining the functionalities of other components consistent with the disclosed embodiments. For example, device 100 may include one or more components wherein a scanner 120 and depth camera 130 occupy the same physical space. In another example, scanner 120 and/or depth camera 130 may be implemented in the same physical component, providing functionalities consistent with a scanner, imager, depth camera/depth sensor, and camera.

In certain aspects, device 100 and its included components may be installed in such a way as to allow for modular upgrades (e.g., consistent with modular implementations such as Google ARA). In some embodiments, a modular upgrade may comprise any removable, exchangeable, upgradable, and/or interchangeable module outfitted to interface with device 100. In certain aspects, a modular upgrade may comprise a device component that improves, supplements, or combines the functionalities of the existing components of device 100. For example, device 100 may include modular components so that a user may upgrade a particular component (e.g., depth camera 130) or add functionalities not present in a base design (e.g., a card reader). A modular upgrade may include any device component consistent with the disclosed embodiments (e.g., a scanner, card reader, GPS device, accelerometer, depth camera, etc.).

Moreover, while FIG. 1 depicts a particular layout of the components comprising device 100, devices consistent with the disclosed embodiments embrace any arrangement of device components. For example, in one illustrative aspect, device 100 may be configured to closely group projector 110 and scanner 120 together on a particular side of the device (e.g., the right side). In another example, device 100 may be configured so that scanner 120 and depth camera 130 reside on opposite ends of the device to facilitate wider field-of-view recognition and increase the parallax angle subtended by the components. The particular components and layout of components depicted in FIG. 1 is exemplary and for illustrative purposes only.

Figure 2A:
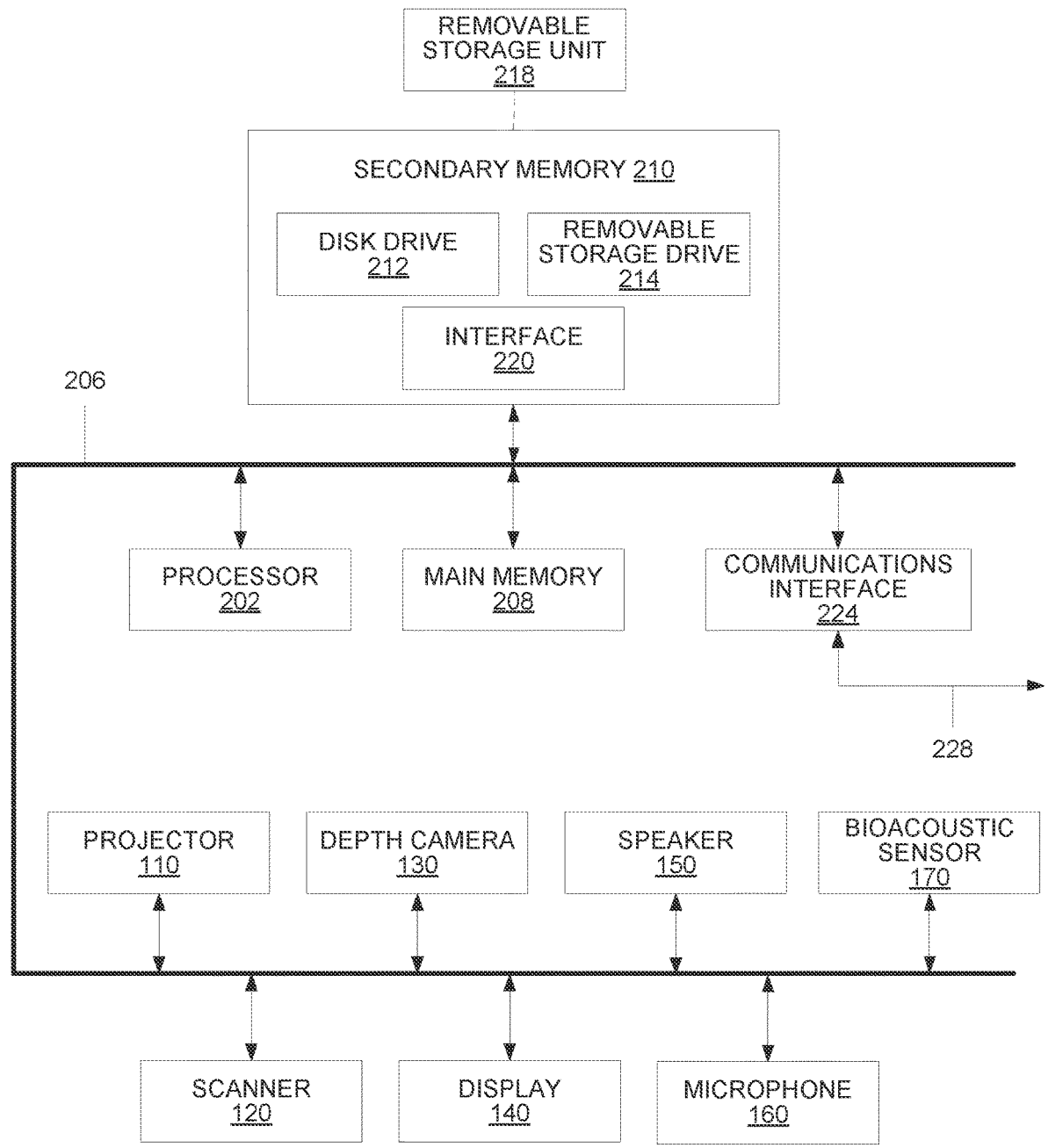
FIG. 2A depicts a block diagram of example components of a wearable processing device consistent with the disclosed embodiments.

FIG. 2A depicts a block diagram of example components of a wearable processing device 100 consistent with the disclosed embodiments. In some embodiments, device 100 may include one or more processors 202 connected to a communications backbone 206 such as a bus, circuitry, wiring, or external communications network (e.g., any medium of digital data communication such as a LAN, MAN, WAN, cellular network, WiFi network, NFC link, Bluetooth, GSM network, PCS network, network 320 of FIG. 6, etc., and any associated protocols such as HTTP, TCP/IP, RFID, etc.). Any component of device 100 may communicate signals over backbone 206 to exchange information and/or data. For example, in one aspect, projector 110, scanner 120, depth camera 130, display 140, speaker 150, microphone 160, and/or bioacoustic sensor 170 may exchange information with each other, provide or receive information or signals to and from processor 202, store or retrieve information in memory, provide or receive information to and from external computing systems, and so on. In some embodiments, components not pictured in FIG. 2 may also communicate over backbone 206, such as an accelerometer, RF circuitry, GPS trackers, vibration motor, card readers, etc. For example, device 100 may include a GPS receiver (not shown) for receiving location and time information from satellites and may communicate such information to the other components of the device, such as processor 202.

In some aspects, processor 202 and accompanying hardware and/or software may act as a controller for the components of device 100. For example, processor 202 may, in connection with hardware components or software instructions, control the transmission, receipt, and processing of signals to and from each of the device components to conduct and manage processes consistent with those described herein. Processor 202 may also control the receipt, processing, and transmission of information and signals to and from external devices and computing systems consistent with the embodiments described below. Thus, while certain aspects are described in connection with processor 202, it should be appreciated that these embodiments may also be implemented via a controller in communication with the accompanying device components or computing systems.

In certain aspects, device 100 may include main memory 208. Main memory 208 may comprise random access memory (RAM) representing a tangible and nontransitory computer-readable medium storing computer programs, sets of instructions, code, or data executed with processor 202. When executed by processor 202, such instructions, computer programs, etc., enable processor 202 or other component of device 100 to perform one or more processes or functions consistent with the disclosed embodiments. In some aspects, such instructions may include machine code (e.g., from a compiler) and/or files containing code that processor 202 may execute with an interpreter.

In some aspects, main memory 208 may also include or connect to a secondary memory 210. Secondary memory 210 may include a disk drive 212 (e.g., HDD, SSD), and/or a removable storage drive 214, such as a magnetic tape drive, flash memory, an optical disk drive, CD/DVD drive, or the like. The removable storage drive 214 may read from and/or write to a removable storage unit 218 in a manner known to the skilled artisan. Removable storage unit 218 may represent a magnetic tape, optical disk, or other storage medium that is read by and written to by removable storage drive 214. Removable storage unit 218 may represent a tangible and nontransitory computer-readable medium having stored therein computer programs, sets of instructions, code, or data to be executed by processor 202.

In other embodiments, secondary memory 210 may include other means for allowing computer programs or other program instructions to be loaded into device 100. Such means may include, for example, another removable storage unit 218 or an interface 220. An example of such means may include a removable memory chip (e.g., EPROM, RAM, ROM, DRAM, EEPROM, flash memory devices, or other volatile or nonvolatile memory devices) and associated socket, or other removable storage units 218 and interfaces 220, which allow instructions and data to be transferred from the removable storage unit 218 to device 100.

Device 100 may also include one or more communications interfaces 224. Communications interface 224 may allow software and data to be transferred between device 100 and external systems (e.g., in addition to backbone 206). Communications interface 224 may include a modem, antenna, transmitter, network interface (e.g., an Ethernet card), communications port, PCMCIA slot and card, etc. Communications interface 224 may transfer software and data in the form of signals, which may be electronic, electromagnetic, optical or other signals capable of being received by communications interface 224. These signals may be provided to communications interface 224 via a communications path (i.e., channel 228). Channel 228 carries signals and may be implemented using wire, cable, fiber optics, RF link, signal transmitter, and/or other communications channels. In one embodiment, the signals comprise data packets sent to processor 202. Information representing processed packets can also be sent in the form of signals from processor 202 through communications path 228.

Figure 2B:
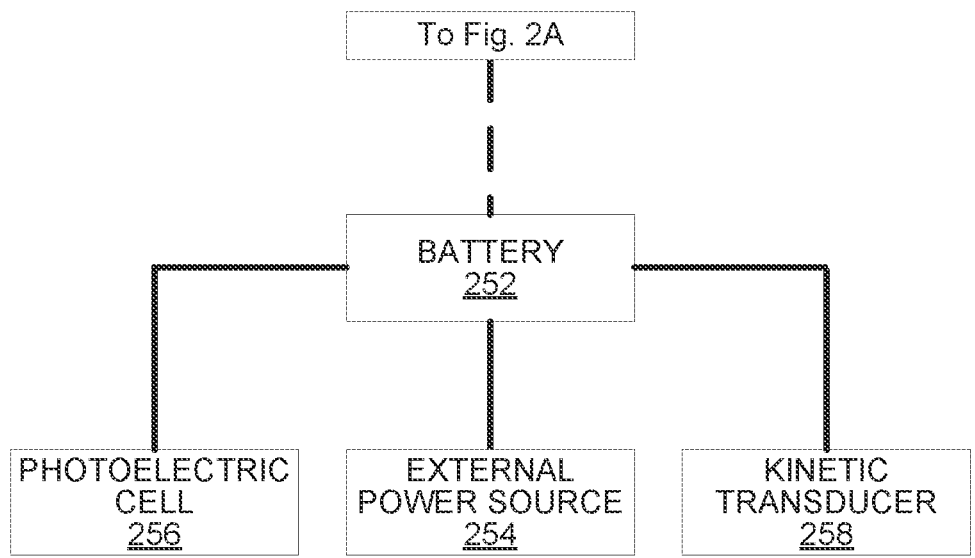
FIG. 2B depicts a block diagram of example power-related components of a wearable device consistent with the disclosed embodiments.

FIG. 2B depicts a block diagram of example power-related components of a wearable device 100 consistent with the disclosed embodiments. Device 100 may include one or more batteries 252 for providing electrical power to the device and its components (e.g., depth camera 130, etc.). Battery 252 may include any suitable type of battery for mobile devices, such as rechargeable batteries, disposable batteries, lithium ion batteries, etc.

In some aspects, device 100 may include peripherals and circuitry (e.g., power ports, cables, wiring, etc.) for providing electrical power to battery 252 or device 100 from other sources to charge or power the battery. For example, device 100 may include hardware for powering battery 252 or device 100 from electrical power delivered from one or more external power sources 254. External power source 254 may include power sources such as external batteries, a power grid running AC or DC current, a wireless inductive charger, etc.

In addition, device 100 may include peripherals and circuitry for powering battery 252 or device 100 from one or more photoelectric cells 256. In some aspects, photoelectric cells 256 may comprise any kind of photoelectric material or surface generating electrical energy in response to light. For example, photoelectric cell 256 may comprise photovoltaic cells such as solar cells housing layers semiconductive material. Photoelectric cell 256 may be installed as a separate component on the surface of device 100 (e.g., as a separate cell). In some aspects, photoelectric cell 256 may be integrated into the device so that the front panel of device 100 (e.g., a portion or substantial portion of the front panel of the device not dedicated to other components) includes a photoelectric surface.

Device 100 may include one or more kinetic transducers 258 for generating electrical energy from kinetic energy. For example, kinetic transducer 258 may comprise a vibration-powered generator for creating electrical energy from vibrations and movements of device 100. Such vibrations may arise, for example, due to movement from the user wearing device 100, driving on bumpy roads, etc. A vibration-powered generator of kinetic transducer 258 may generate electrical energy using methods specifically designed for smaller environments, such as magnets on a cantilever, spring-mass systems, etc. Device 100 may include the necessary peripherals and circuitry for powering battery 252 or device 100 from electrical power generated by the kinetic transducer 258.

In certain embodiments, device 100 may include pliable, bendable, or flexible boards and electronics facilitating improved device functionality for conforming to the human body (e.g., as worn around an arm). In some aspects, the pliable boards may allow device 100 to account for different use configurations, such as different sizes of a human arm. For example, the components of device 100 (e.g., depth camera 130, processor 202, etc.) may be electrically connected to each other via bendable boards of electronics so that the components can transfer information and data while worn. The pliable boards and electronics may comprise any structure known to one of ordinary skill in the art such as, for example, graphene, flexible printed circuits, flexible flat cables, etc.

Figure 3:
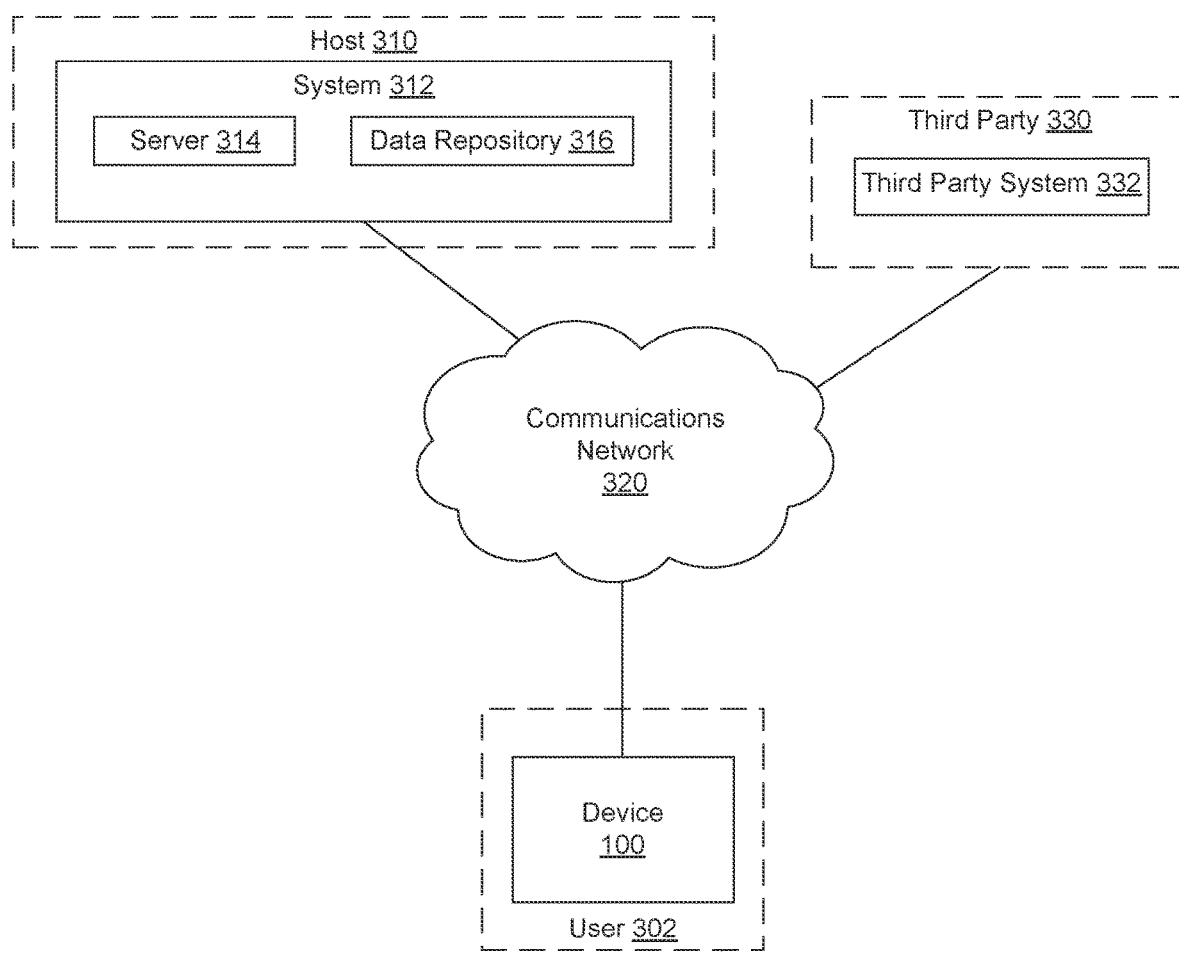
FIG. 3 depicts an example system environment consistent with the disclosed embodiments.

In some embodiments, device 100 may receive, obtain, store, process, generate, and provide information to and from other computer systems, devices (e.g., devices 100), and other technologies (e.g., via communications interface 224). FIG. 3 depicts an example system environment 300 of device 100 consistent with the disclosed embodiments. In one aspect, the environment may include one or more wearable devices (e.g., devices 100) associated with respective one or more users (e.g., user 302), one or more systems (e.g., system 312) associated with a host (e.g., host 310), and one or more third party systems (e.g., third party system 332) associated with one or more third parties (e.g., third party 330). One or more communications networks 320 may connect one or more of the components of system environment 300.

Communications network 320 may include one or more communication networks or media of digital data communication. Examples of communication network 320 include a local area network ("LAN"), a wireless LAN, a cellular network, an RF network, a Near Field Communication (NFC) network (e.g., a WiFi network), a wireless Metropolitan Area Network (MAN) connecting multiple wireless LANs, NFC communication link(s), any physical wired connection (e.g., via an I/O port), a Personal Area Network (PAN) (e.g., Bluetooth), and a wide area network ("WAN") (e.g., the Internet). Consistent with the disclosed embodiments, communications network 320 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 320 may also include one or more mobile device networks, such as a GSM network or a PCS network, allowing a device 100 to send and receive data via applicable communications protocols, including those described herein.

In some embodiments, system 312 may include one or more computer systems configured to receive, process, generate, provide, and store information. In certain aspects, system 312 may also be configured to execute software instructions to perform one or more processes consistent with the disclosed embodiments. In some exemplary embodiments, system 312 may be associated with a host 310, although such association is not required. Host 310 may be any type of entity (e.g., a business, common carrier, postal service, enterprise, service provider, merchant, military entity, financial institution, school, etc.) consistent with the disclosed embodiments. For example, system 312 may include a computer system associated with a business that provides common carrier or postal services.

System 312 may include one or more servers 314. In one embodiment, server 314 may include a front end, a back end, and one or more processors, although server 314 is not limited to such configurations. For example, the front end and the back end may be incorporated into a single computer, a single server (e.g., server 314), or any additional or alternate computing device apparent to one of ordinary skill in the art. Server 314 may also include distributed computing devices and computing systems. In one embodiment, front end may be one or more software programs, such as a software application (e.g., a web service) executed by one or more processors included in server 314. Similarly, back end may be one or more software programs executed by one or more processors included in server 314. Server 314 is not limited to such configurations. In additional embodiments, front end software can be executed by a server or computing system separate from a server or computing system that executes back end.

Server 314 may be configured to execute software instructions to perform one or more processes consistent with the disclosed embodiments. In one embodiment, for example, a device (e.g., device 100) may exchange information facilitating execution of one or more processes disclosed herein. In some aspects, the device 100 and system 312 may be configured to share, partition, manage, or coordinate the processing functions disclosed herein. For example device 100 may be configured to perform certain subroutines associated with a process, send information to system 312 (e.g., via network 320), and receive processed information from system 312 after the system conducts additional subroutines on the information. In another example, system 312 may send an input to device 100 initiating a device process, receive data obtained from the device, and conduct further processing on the received data. In this manner, device 100 and system 312 may be configured to share processing loads, perform additional functions, and exchange information. In other aspects, server 314 may perform its own processes unrelated to device 100. For example, a user or customer of host 310 may access a web page or mobile application associated with system 312 (e.g., through a web server executed on server 314) through a computer system such as a smartphone or personal computer, and subsequently provide or receive information to and from system 312, register for account services hosted on system 312, and the like.

System 312 may include one or more data repositories 316 configured to store information consistent with the disclosed embodiments. In certain aspects, information stored in data repository 316 may include information about a device 100 (e.g., serial number, last known communication, installed components, etc.), information received from a device (e.g., data gathered from a device component), information related to one or more users associated with a device (e.g., user account information, a user's login and credential data, user identification data such as IDs, custom input definitions, user preferences, calibration data, etc.), information received from third parties (e.g., third party system 332), or any other information consistent with the disclosed embodiments. Additionally or alternatively, this information may be stored in a memory of device 100 (e.g., memories 208 or 210). In some aspects, system 312 may be configured to receive, obtain, gather, collect, generate, or produce information to store in data repository 316. In certain embodiments, for instance, system 312 may receive or obtain information for storage over communications network 320. In some aspects, system 312 may be configured to provide information stored within data repository 316 to device 100. In other aspects, device 100 may be configured to access data repository 316 directly (e.g., via network 320) to facilitate information exchange between device 100 and system 312. System 312 may also be configured to store information received from device 100 in data repository 316.

Third party system 332 may include may include one or more computer systems configured to receive, process, generate, provide, and store information. In some aspects, third party system 332 may be associated with a third party 330. Third party 330 may represent any business, entity, person, etc., capable of receiving, providing, processing, or generating information to and from device 100 and/or system 312. Third party system 632 may include its own computing systems, servers, data repositories, processors, etc., similar to that of system 312. In some aspects, device 100 and/or system 312 may be configured to receive and provide information, or share processes with, third party system 332 consistent with the disclosed embodiments.

In some aspects, devices 100 may be configured to transmit, receive, and exchange information with each other over communications network 320. For example, data gathered or generated in device 100 (e.g., a picture, a scanned barcode, a video, a generated model, etc.) may be transmitted to another wearable device (not shown). In this example, the receiving device may receive the transmitted information over network 320 from device 100 and conduct its own processes consistent with the disclosed embodiments (and vice versa). In some aspects, data exchanged between two or more devices may also be transmitted to another computer system (e.g., system 312), but such transmission is not required. For example, user 302 may take a picture with device 100 and send the picture to another device associated with another user via a NFC network. In this example, the receiving device may receive the picture and conduct further processing such as storing the picture, projecting the picture onto a surface (where it may be resized, manipulated, etc., as described below), displaying the picture on the device display 140, and so on.

In some embodiments, device 100 may be configured to interface with other apparatuses, accessories, machines, devices, and technologies not shown in FIG. 3. Device 100 may be configured to interface with these other technologies in any way consistent with the disclosed embodiments (e.g., via network 320, a connector port on device 100 such as a USB port or I/O port, Bluetooth, a proprietary port or connection method, etc.). For example, device 100 may be configured to interface with, exchange information between, and facilitate processing with other technologies such as GPS receivers, thermal imagers, x-ray scanners, pH readers, telescopes, microscopes, breathalyzers, glucose meters, thermometers, external speakers, external displays, smartphones, Geiger counters, lasers, card readers, RF radios, printers, health or medical monitors (e.g., heart rate and blood pressure sensors, etc.), and/or any other device capable of gathering, exchanging, or processing information as an input or output. In some alternative embodiments, these technologies may be included as device components within device 100, as described above.

In certain embodiments, these components may also facilitate information exchange between multiple devices or computer systems. For example, device 100 may be configured to interface with a docking station (not shown) associated with an external computer system such as system 312. Device 100 may be configured to connect to the docking station via any wired or wireless communications network 320. In some embodiments, device 100 may be configured to receive data from and transmit data to the docking station. The docking station may be configured to receive, exchange, transmit, and synchronize information from device 100 and system 312.

While FIG. 3 illustrates an exemplary system environment 300 with only one device 100, the disclosed embodiments may include additional devices and users. In some aspects, a user may be associated with one or more devices, and a device may be associated with one or more users. Similarly, environment 300 may include a plurality of hosts 310 and third parties 330, each associating with one or more systems 312 and third party systems 332, respectively.

Figure 4A:
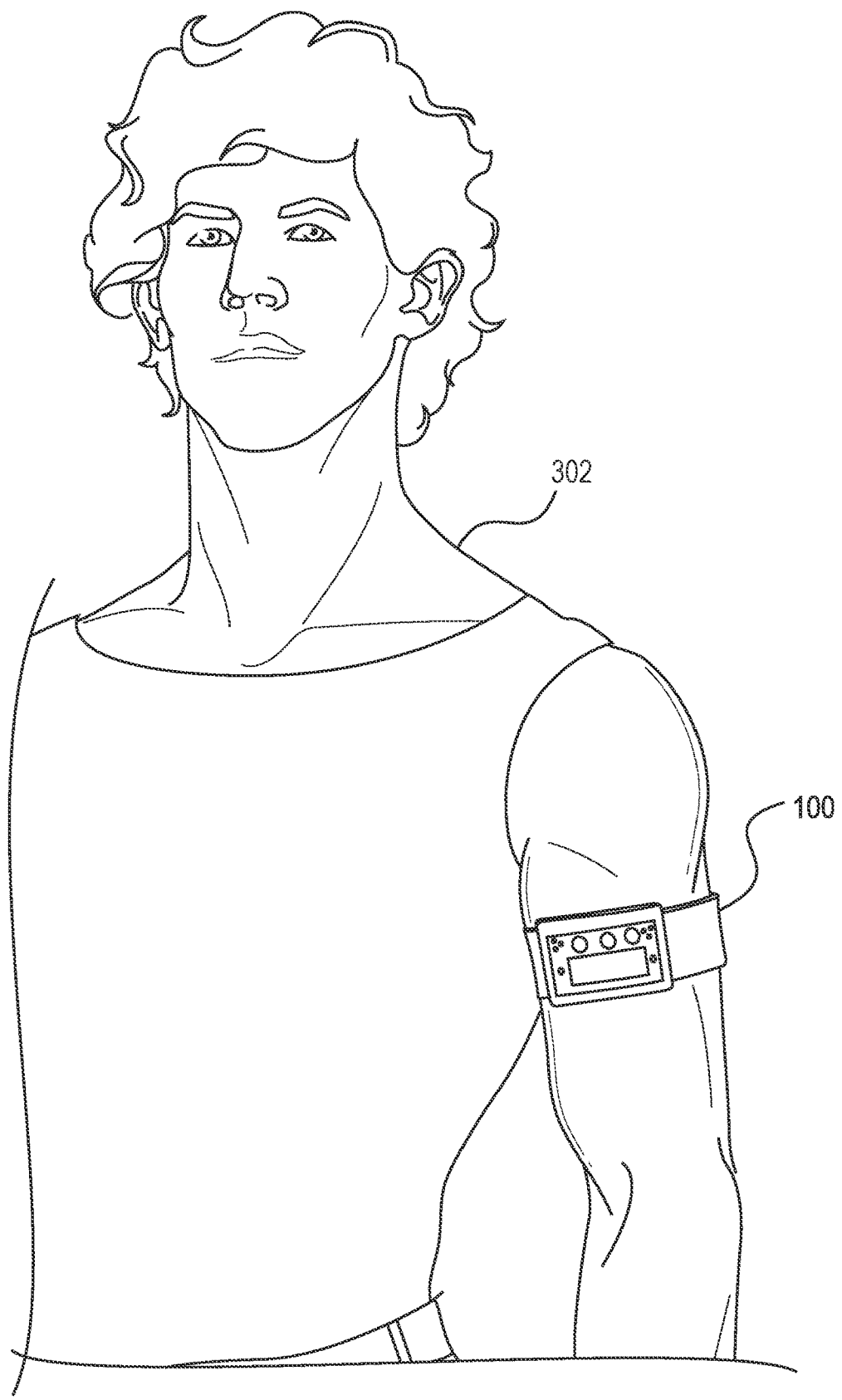
FIG. 4A depicts an example illustration of a worn device on a user's arm consistent with the disclosed embodiments.
Figure 4B:
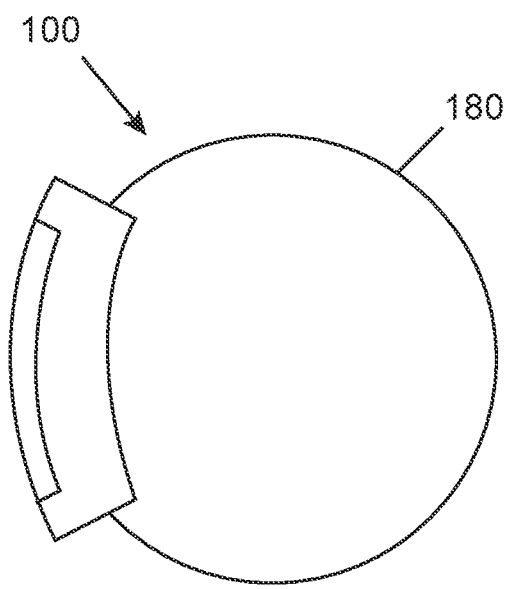
FIG. 4B depicts a cross section of an example device when worn consistent with the disclosed embodiments.

FIG. 4A depicts an example illustration of a worn device 100 on a user's arm consistent with the disclosed embodiments. In some aspects, a user 302 may wear device 100 on his or her person. Device 100 may be designed for comfortable use on a user's arm, shoulder, leg, wrist (e.g., as a watch), or any other body part (e.g., via connector 180). In certain embodiments, device 100 may be specifically designed and configured for wearing around a user's upper arm. For example, as depicted in FIG. 4A, device 100 may rest comfortably on the upper portion of a user's arm using an adjustable connector 180 such as an adjustable band, strap, or frame. When worn (e.g., the connector is in a connected state), connector 180 may cause the cross section profile of device 180 to take on a substantially elliptical shape (e.g., having an eccentricity less than, for instance, 0.2, as depicted in FIG. 4B). The substantially elliptical cross section of device 100 may facilitate wearing the device around a user's arm. For example, the semiminor diameter of the device cross section may, in some embodiments, not exceed that of the arms of most human beings, such as six, seven, eight, or nine inches. Connector 180 may also permit the cross section of device 180 to exceed these bounds for larger individuals (e.g., via a larger connector, an elastic connector, a removable connector, etc.). In addition, connector 180 may cause the cross section of device 180 to take other shapes, such as a crescent moon, U-shape, or other shape corresponding to a full or partial cross-section of a human arm.

Figure 7A:
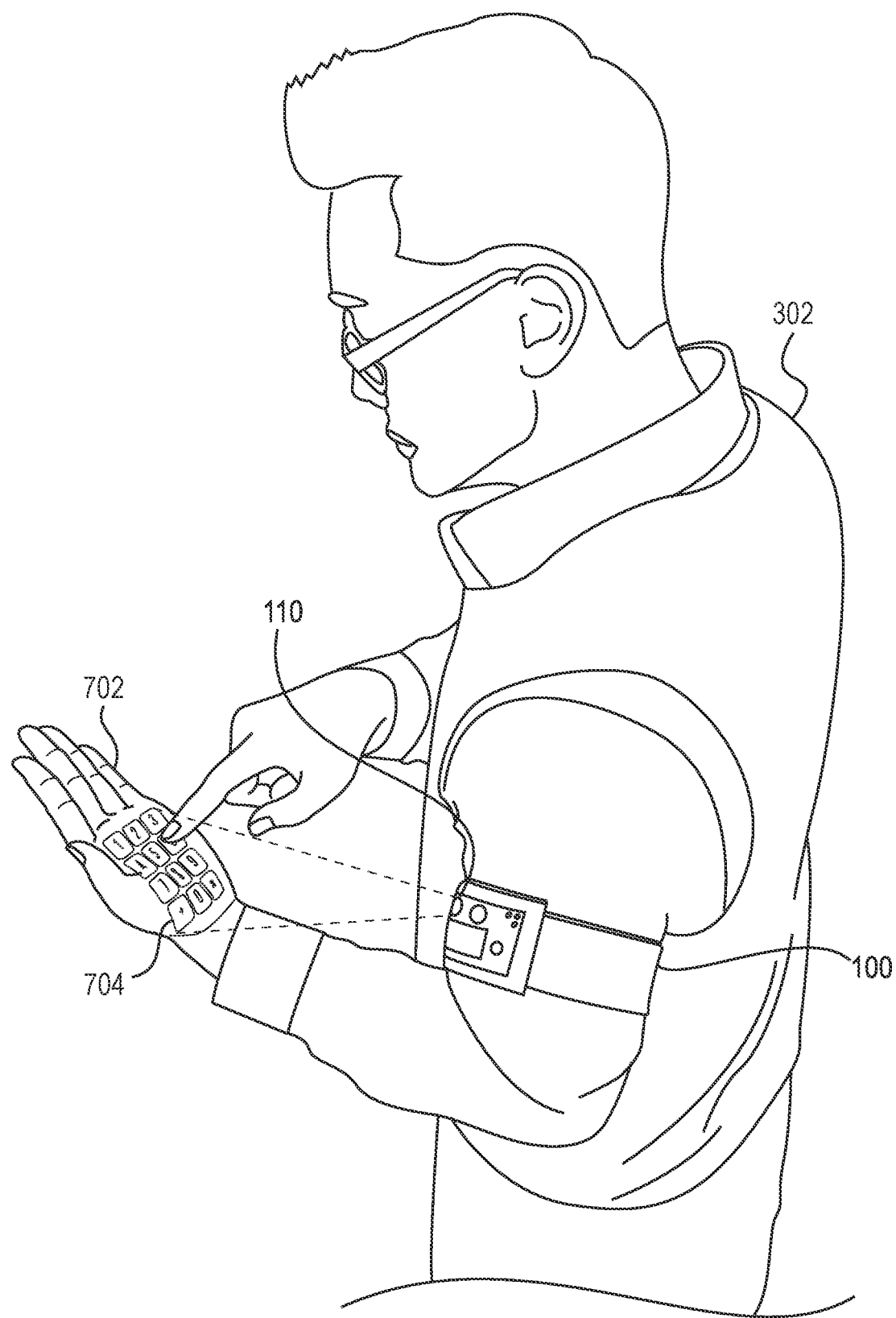
FIG. 7A depicts an example interactive interface projected onto a surface consistent with the disclosed embodiments

In some aspects, device 100 may rest directly on the skin of the user 302 (e.g., as depicted in FIG. 4A). In other aspects, the device 100 may be designed to rest on the clothing of the user 302 without making contact with the user's skin (e.g., as depicted in FIG. 7A). Aside from the contact incident to being worn over clothing, for example, device 100 may perform processes disclosed herein without direct physical contact, input, or manipulation from the user 302 such as pressing a screen or button on the device, holding the device, manipulating the device, or similar physical interactions. In certain aspects, this absence of direct contact (e.g., with the user's skin, configuration for use away from the user's head area) may be designed to improve the device's compliance use requirements such as workplace regulations (e.g., OSHA requirements), internal company standards, third party metrics, user hygiene concerns, and user preferences.

In some embodiments, the components of device 100 may be designed, placed, and optimized for use on a user's arm. For example, as depicted in FIG. 1, one or more bioacoustics sensors 170 may be located on the interior surface area of device 100 to facilitate proper biometrics readings. In another example, device 100 may include a heart rate monitor, perspiration monitor, or other kind of medical sensor located on the interior surface of device 100. The bioacoustic sensors 170, heart rate monitor, or other such devices may form an array on the interior surface of device 100.

In certain embodiments, the device 100 may include or operate with other materials for use on a user's arm. For example, the interior area of device 100 may be lined with a particular material or sleeve to optimize user comfort and device functionality when worn on an arm. In another example, device 100 may be configured to operate with a disposable material lining (e.g., a sleeve, band, lining, etc.) such that the device 100 will not operate, or operates with reduced functionality, when it does not detect that the user is wearing the disposable lining. In other aspects, the disposable material lining may not affect the functionality of device 100. For example, in one aspect, device 100 may be configured to operate over a thin plastic lining to enhance hygiene associated with wearing device 100.

Device 100 may also be designed for ruggedized and durable use, capable withstanding falls from several meters, contact with hard surfaces (e.g., walls, countertops, concrete, etc.), small concussive forces, and the like. For example, device 100 may be configured to fit within a padded cover, include an extra cage or protective layer made out of a rugged material (e.g., metal, Kevlar, padding, rubber, etc.), comprise scratch-resistant surfaces and displays (e.g., containing Gorilla Glass), etc. In one aspect, for instance, device 100 may include a hard, bendable casing composed substantially of rubber polymers (e.g., 80% by weight). In some embodiments, this casing may form a watertight seal around device 100 and/or its internal electrical components. In certain aspects, the casing may include an opening, recess, or gap so that the face of device 100 remains open to the air or light. In some embodiments, the gap in the casing may be filled with a transparent material, layer, or film (e.g., comprising glass, plastic, synthetic fiber, crystal, etc.) creating a protective barrier between the device components and the outside environment.

In some aspects, device 100 may also be configured to comply with industrial, enterprise, military, and/or other government specifications. For example, in one exemplary embodiment, device 100 may be configured to comply with MILSPEC 810G or any other specified government regulatory identifier for determining ruggedization requirements of a device. In certain aspects, device 100 may be configured to withstand extreme weather and/or environmental conditions such as low temperatures, high temperatures, high humidity, low or high pressure, water submersion, the presence of sand, rain, chill, frost, heat, and the like. For example, device 100 may be configured for operation deep within the ocean depths (e.g., by including a watertight casing surrounding the electrical components of the device), atop a high mountain, in a windy desert, and so on. In some embodiments, device 100 may be configured to withstand other foreseeable use conditions such as the presence of sweat (e.g., via seals enclosing the internal surface of the device).

In some embodiments, device 100 may determine the physical landscape of its environment using one or more of its components. For example, device 100 may include a depth camera 130 for determining the depths of objects in its field of view. As recognized by depth camera 130, the depth of field may comprise a two-dimensional array of points (e.g., pixels) wherein each point is associated with a set of coordinate, including position and depth. Each pixel may also be associated with other attributes such as color (e.g., an RGB value, CYMK value, or similar index), consistent with the disclosed embodiments. Device 100 may use the coordinates and other attributes of each point in the field of view in determine the three-dimensional properties of the space within it.

Figure 5A:
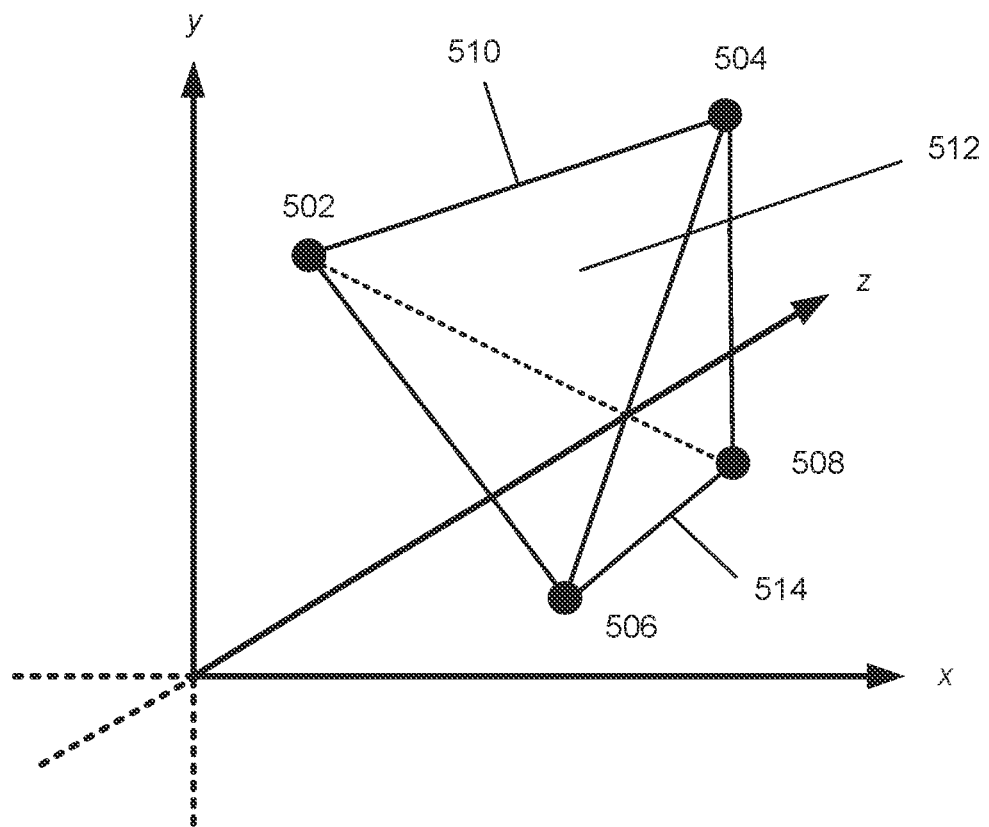
FIG. 5A depicts an example depth field of a depth camera consistent with the disclosed embodiments.
Figure 5B:
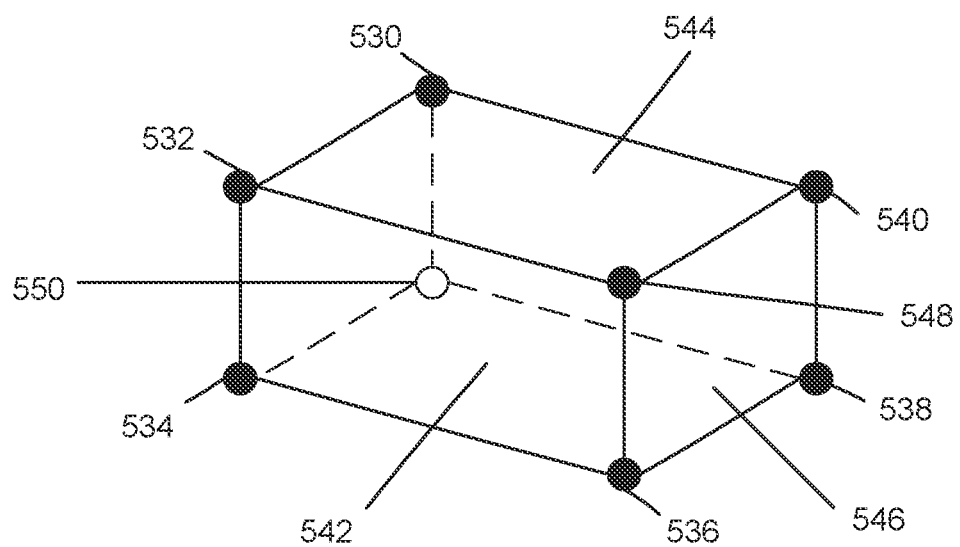
FIG. 5B depicts an example object in a depth field for dimensioning purposes consistent with the disclosed embodiments.

For example, FIG. 5A depicts an example depth field of a depth camera 130 consistent with the disclosed embodiments. In certain aspects, depth camera may detect a point 502 in its view. Point 502 may reflect an elementary unit in camera space, representing the smallest resolvable feature (e.g., a pixel), or a group of such units (e.g., a pixel group containing a plurality of pixels) in the field. Depth camera 130 and may associate point 502 with coordinates indicating the position and depth of point 502 in camera space. In the example coordinate system depicted in FIG. 5A, for example, these coordinates may take the form of Cartesian coordinates (x,y,z). Depth camera 130 may use other types of coordinate systems, such as spherical coordinates, cylindrical coordinates, proprietary coordinates and data structures, etc., and these coordinates systems may also account for features of depth camera 130 such as lens shape (e.g., by creating a perspective or projected coordinate system, etc.). Depth camera 130 may also associate point 502 with one or more colors, such as an RGB triplet, CYMK quadruplet, etc. Moreover, while FIG. 5A depicts the coordinate axes to indicate a sense of depth, the environment sensed in depth camera 130 may take the form of a two-dimensional array of pixels, each associated with a depth value (e.g., due to projecting the three dimensional environment onto a two-dimensional space) such as depicted in FIG. 5B, and the inclusion of the axes in FIG. 5A is for illustrative purposes.

Device 100 may include hardware and/or software implementing mathematical algorithms to determine relationships between pixels and points in camera space. For example, device 100 may determine the distance 510 between two points (e.g., between two pixels) using algorithms implemented via depth camera 130 or software implemented within the device (e.g., executed by processor 202). In the example of FIG. 5A, for instance, device 100 may determine the three-dimensional distance 510 between points 502 and 504 using the relationship $d = \sqrt{(x_{504}-x_{502})^2+(y_{504}-y_{502})^2+(z_{504}-z_{502})^2}$, where x, y, and z reflect the coordinates of points 504 and 502 (respectively denoted by subscripts). As appreciated by one of ordinary skill in the art, other coordinate systems may employ different distance formulae, and the exemplary relationship above is for illustrative purposes only. Moreover, device 100 may determine distances in additional ways. For example, device 100 may determine the distance 510 between two points by numerically adding the subdistances between adjacent pixels lying along the path from point 502 to 504.

Device 100 may also determine the surface area 512 subtended by three noncolinear points via depth camera 130 or software executed by processor 202. For example, device 100 may determine the surface area 512 subtended by points 502, 504, and 506 using the relationship A=($\frac{1}{2}$)bh, where A is the surface area 512, b is the length of one of the edges of the surface (e.g., as calculated above for distance 510), and h is the distance of a line segment from an opposing point not associated with that edge (e.g., point 506) forming a right angle with the edge. As understood by one of ordinary skill in the art, other coordinate systems may include different expressions of surface area 512. In addition, device 100 may employ other methods for determining the surface area 512 between three points, such as numerical methods. For example, device 100 may determine the area of a surface by partitioning the surface into groups of three pixels (or pixel groups) and summing the component surface areas among groups within the surface. Device 100 may also employ other formulations such as Riemann sums, numerical area integrals, etc. Moreover, device 100 may determine the surface area of surfaces spanning more than three points (e.g., an n-gon) by partitioning the surface into regions of three points (e.g., wherein each edge is shared with another group), finding the surface area of each region (e.g., as above), and summing the result. Those of ordinary skill in the art will appreciate other ways to generate or approximate surface area 512 consistent with the disclosed embodiments.

Device 100 may also determine or estimate the volume 514 of an object using processes implemented via depth camera 130 and/or processor 202. As depicted by the tetrahedron in FIG. 5A, for example, device 100 may determine the volume subtended by four or more nonplanar points/vertices (e.g., points 502, 504, 506, and 508) using an relationship such as V=($\frac{1}{3}$)Ah, where V is volume 514, A is the surface area of a base (e.g., the surface area 512 calculated above), and h is the height between the base and its opposing point (e.g., point 508). Other coordinate systems may employ other expressions for the volume 514. In addition, device 100 may determine the volume of objects spanning more than four points numerically by partitioning the object into regions of four nonplanar points, finding the volume of each region (e.g., as above), and summing the result. Device 100 may also estimate the volume of an object by integrating the volume numerically (e.g., dividing the object into pixels or pixel groups and numerically integrating the object function f an over a domain D having coordinate set u with volume element dV, $\iiint_D f(u)dV$).

Device 100 may use other numerical methods to estimate the volume of an object. In some aspects, the numerical methods may prove beneficial for estimating the volume 514 of complicated objects, when the object include points invisible to depth camera 130 (e.g., because the camera cannot see through solid objects), and other such considerations. In some embodiments, device 100 may estimate an object's volume by making certain assumptions about the object. For example, device 100 may assume that an object subtended by several points exhibits a particular symmetry (e.g., radial, bilateral, spherical, etc.), a feature common in a wide range of objects. Additionally or alternatively, device 100 may assume that the object has a substantially regular shape, such that it appears similar when reflected or rotated about certain axes. Based on these assumptions, device 100 may, via software executed by processor 202, estimate the location of invisible points or edges of the object and generate a volume accordingly.

FIG. 5B illustrates an example object in a depth field for dimensioning purposes consistent with the disclosed embodiments. In some aspects, device 100 may determine a particular object is subtended by a group of points (e.g., using processes consistent with those disclosed herein, such as edge and corner detection algorithms). In the example object in FIG. 5B, for example, device 100 may determine (e.g., via depth camera 130 and/or software executed by processor 202), that an object is subtended by points 530, 532, 534, 536, 538, 540, and 548. In certain aspects, this object may reflect any object substantially taking the form of a rectangular or trapezoidal prism, such as a box, package, phone, book, etc. In certain aspects, device 100 may determine the surface area or volume of the object using the embodiments described above (e.g., partitioning the object into groups of points, determining the area/volume of these regions, and summing the result).

In other aspects, device 100 may assume that the object subtended by these points has a substantially regular orientation or exhibits a particular symmetry. Using this assumption, device 100 may determine that the object likely includes an invisible point (vertex) 550 undetected in the field of depth camera 130 (e.g., because the object is opaque) having a location based on the assumed symmetry. This determination may follow from, for example, assuming that the distances associated between points 532 and 534, 548 and 536, and 540 and 538, should be imputed to the distance between points 530 and an invisible point 550. The edges connecting point 550 and points 534 and 538 may be resolved in the same manner (e.g., using the related edges). Similarly, device 100 may make this determination by imputing the surfaces 542, 544, and 546 onto their respective opposite (e.g., parallel) surfaces containing invisible point 550. In addition, device 100 may determine an invisible vertex by identifying a flat surface of the object (e.g., by determining a region in which many contiguous pixel groups share parallel normal vectors, as described below), identifying the coordinates of other known vertices, and imposing a rule that the object exhibits a symmetry about an axis associated with the flat surface.

Device 100 may determine the estimated location of invisible point 550 using the above calculations. For example, device 100 determine the location (e.g., coordinates) of invisible point 550 by averaging the edge lengths between similar points (e.g., the distance between points 530 and 550 should reflect the average distances between points 532 and 534, 548 and 536, and 540 and 538, repeating this process for other edges, etc.), imputing the surface faces to their opposing counterparts as described above, applying two- or three-dimensional rotation and translation matrices to the visible object to determine its expected orientation in the opposing direction (e.g., the edge distance between points 530 and 550 should be equal to that of points 548 and 536), etc. Device 100 may use the assumptions of object symmetry and/or regularity to generate the locations of several such invisible points. After estimating the location of the invisible point(s), device 100 may then use foregoing embodiments to calculate or update the volume of the object using the invisible points. In this manner, device 100 may generate estimates of the object's volume with a greater degree of accuracy.

In addition, device 100 may determine other properties of objects and surfaces within the field of view of depth camera 130 using mathematical relationships (e.g., geometrical relationships) flowing from the above discussion. For example, device 100 may determine an expression for a line passing through two points in the coordinate system (e.g., points 502 and 504) based on their coordinates using equations such as $ax+by=c$, or other such formulation based on the coordinate system. Similarly, device 100 may determine the expression for a plane in the coordinate system (e.g., as subtended by points 502, 504, and 506) based on the points' coordinates using equations such as $ax+by+cz=d$ or other forms, depending on the coordinate system. Device 100 may then use these relationships to determine features of the environment, such as the normal vectors to the surfaces 512, whether three points are coincident on a line, whether four points are coincident on a plane, etc. For example, for a surface (e.g., having surface area 512) coincident with a plane having the form $f(x, y, z)=ax+by+cz+d=0$, the normal vector to this plane may take the form $N=\nabla f$ where $\nabla$ is the gradient operator. Other expressions for normal vectors will be appreciated to one skilled in the art, based in part on the coordinate system used and the form in which the plane is approximated (e.g., via numerical techniques). For example, given three points in a coordinate system, device 100 may compute a normal vector to these points by determining the vectors spanning a first point to a second point and the first point to a third point (e.g., by subtracting the coordinates from one point to another), and computing a cross product of the resultant vectors. Device 100 may also determine whether this normal vector is appropriately directed (e.g., whether it points inward or outward from the object surface), and adjust the normal vector accordingly (e.g., multiplying it by −1 to force the vector to point outward). Device 100 may determine these values numerically via, for example, software instructions executed by processor 202.

In some embodiments, the determination of line segments, distances, lines, planes, normal vectors, etc. may impart knowledge as to the orientation of surfaces and objects (e.g., based on their line/plane equations, normal vectors, volumes, etc.) in the field of view of depth camera 130. In one example, the normal vector to a surface indicates its three-dimensional orientation. Device 100 may thus partition any object into groups of points to find their surface areas, volumes, normal vectors, etc., to determine the surface areas, volumes, and orientations of the object. Moreover, device 100 may employ further elaborations of the foregoing discussion apparent to one of ordinary skill in the art to conduct processes consistent with the disclosed embodiments. For example, device 100 may compute depth gradients of a field of view of depth camera 130 in the x and/or y directions (e.g., using partial derivatives), thereby determining the rate of depth changes in the field in these directions. As discussed above, the foregoing calculations may be performed by depth camera 130, processor 202 connected to depth camera 130, or any external computing system (e.g., a system connected to device 100 via communications network 320).

Device 100 may also determine the properties of objects (e.g., surface areas, volumes, normal vectors, etc.) based on models received from an external source or stored in a memory (e.g., on the device or on an external system). The models may be pregenerated to reflect likely objects the device is likely to encounter. For example, in the field of courier services, device 100 may store three-dimensional representations of packages, slips, and boxes commonly used by a particular company or brand. Device 100 may then determine the properties of an object by comparing it to the one or more object models and, if it detects a match, imputing the known properties of the model (e.g., sizes, specifications, weights, company name, etc.) onto the current object. Device 100 may conduct this process by implementing, for example, software instructions executed by processor 202.

Device 100 may begin detecting a match by determining the bounds (e.g., vertices) of an object using processes consistent with the disclosed embodiments (e.g., as described above and in connection with FIG. 6). Device 100 may then apply rotation, scaling, and/or translation matrices to the current object (before or after generating any invisible vertices), and determining if the rotated, scaled, and translated object matches a modeled object. Device 100 may detect a match when the vertices of the manipulated object match those of a model, when the normal vectors of the current object and the model coincide within some confidence threshold (e.g., not deviating by more than a threshold value of degrees/radians, etc.), and so on. If a match is not detected, device 100 may continue processing the object consistent with the disclosed embodiments. In other aspects, device 100 may transmit the object information to an external system (e.g., system 312) to conduct the model comparison externally, and receive the results of the comparison via communications network 320. Indeed, device 100 may transmit any information consistent with the foregoing and following discussion to an external system (e.g., system 312) to conduct the disclosed processes, and device 100 may receive the results of these determinations (e.g., surface areas, volumes, etc.) via communications network 320.

Returning to FIG. 5A, device 100 may use information contained in each pixel to determine certain properties of the objects in a field of view of depth camera 130. For example, device 100 may determine that its depth of field contains an object (e.g., subtended by points 502, 504, 506, and 508) among a background (e.g., pixels having depths further away from the object, consistent with a wall, floor, nearby trees, etc.). Device 100 may determine the bounds and extents of objects using several techniques. For example, device 100 may use processes to determine the edges and/or corners of objects in an image. In one aspect, device 100 may employ an edge detection algorithm to detect the edges of objects appearing in the field of view (e.g., to detect edge 510). These edge detection algorithms may comprise any suitable edge detection algorithm known in the art (e.g., Canny edge detection, phase-congruency, etc.) in addition to supplements or alternatives to these methods (e.g., thresholding, edge thinning, differential edge detection, etc.). For example, processor 202 may apply a Canny edge detection window to a signal from depth camera 130. This window comprise the steps of applying a Gaussian filter to the data to smooth the noise, determining the intensity of the gradients of the image, applying nonmaximum suppression to thin the potential edges, applying a double threshold to determine potential edges (e.g., discarding edges below a first threshold), and tracking the potential edges by hysteresis (e.g., suppressing edges below a second, higher threshold that are not connected to an edge above the second threshold). Other modifications of such an edge detection window will be apparent to one of ordinary skill in the art.

Alternatively or additionally, device 100 may employ a corner detection algorithm to detect corners of objects in the signal from depth camera 130. Such corner detection algorithms may include any suitable process known to one of ordinary skill in the art, such as the Moravec, Harris and Stevens, Förstner, multi-scale Harris, Wang and Brady, Trajkovic and Hedley, and SUSAN algorithms, and so on. In certain aspects, these corner detection algorithms may indicate the presence of corners of an object, such as points 502, 504, 506, and 508 of FIG. 5A.

In some embodiments, device 100 may refine the results of the edge and/or corner detection using the depth coordinates of each pixel. For example, device 100 may require two pixels forming an edge to be within a threshold distance of each other (e.g., to differentiate the object from the background or other distance objects). Moreover, device 100 may suppress pixels flagged as corners having a smooth depth gradient above a threshold (e.g., because the pixel is not truly a corner). Device 100 may employ other types of object detection algorithms suitable for such purposes (e.g., Gabor filters, noise reduction, Sobel operators, image gradients, depth gradients, etc.), and the discussion of certain algorithms herein is for illustrative purposes only. For example, device 100 may compute derivatives of a current depth field to generate a derivative depth maps or derivative intensity/color maps. These derivatives may be computed numerically by determining the change in the depth or intensity between two points (e.g., adjacent pixels), and dividing that change by the distance between them. In some aspects, device 100 may use these gradient or derivative maps to conduct further object recognition (e.g., recognizing a user's finger as discussed below), perform further image refinement (e.g., edge detection), and so on.

Figure 6:
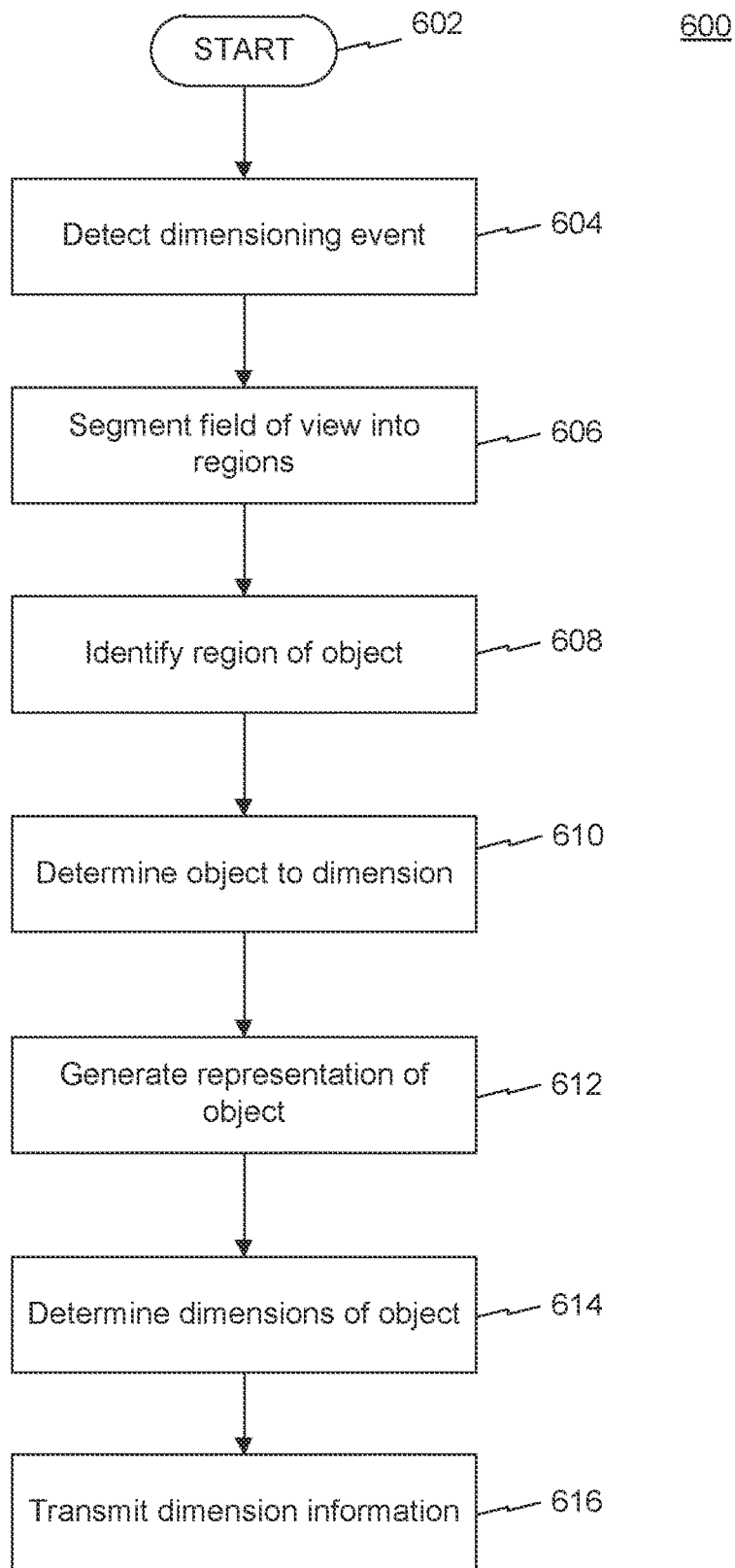
FIG. 6 depicts a flowchart of an example process for dimensioning objects consistent with the disclosed embodiments.

FIG. 6 depicts a flowchart of an example process 600 for dimensioning objects using device 100 consistent with the disclosed embodiments. Process 600 may be implemented via hardware and/or software executed in device 100, such as a depth camera 130 communicatively connected (e.g., via backbone 206 or other circuitry) to a processor 202 executing software instructions, in addition to other device components. Further, process 600 may be implemented in whole or in part on other computing systems, such as system 312 in communication with device 100 over communications network 320. Process 600 or its subroutines may be implemented as a standalone process or as part of a larger process (e.g., determining orientations of objects for scanning or signature processes of FIGS. 8 and 9, etc.) consistent with the disclosed embodiments.

In some aspects, process 600 may begin (step 602) by detecting a dimensioning event (step 604). A dimensioning event may comprise of any input event detectable by device 100 as further described below. For example, the dimensioning event may comprise a detecting that a user 302 has tapped twice on an object she wishes to dimension (e.g., via depth camera 130), receiving an audio command (e.g., via microphone 160), detecting an input entered into a projected interface (e.g., using projector 110 and depth camera 130), etc. Additional types of dimensioning events (e.g., input events) and the manner of their detection are further discussed herein.

Process 600 may include segmenting the field of view from depth camera 130 into a plurality of regions (step 606). Process 600 may segment (e.g., partition) a field of view into regions using the edge, corner, and feature detection algorithms disclosed above. For example, in one embodiment, processor 202 may apply edge detection filter(s) to signals received from depth camera 130 to detect object edges in the field of view. Additionally or alternatively, processor 202 may apply a corner detection filter to the original or modified signals (e.g., as filtered by the corner detection filter) to determine the location(s) of object corners in the field of view. In some embodiments, processor 202 may also apply additional filtering algorithms such as threshold testing (e.g., suppressing edges below a threshold strength), edge thinning (e.g., suppressing edges wider than a threshold number of pixels), and types of filters or windows consistent with the disclosed embodiments.

Process 600 may include identifying a region associated with an object the user wishes to dimension (step 608). Device 100 may identify this region using any kind of input event specifying a particular region consistent with the disclosed embodiments. In one embodiment, for instance, device 100 may determine the region based on the dimensioning event. For example, the dimensioning event may include a particular input event (e.g., a gesture input) the user performed in the object itself, such as tapping the object a certain number of times. In such embodiments, the identified region may reflect the region proximate to the dimensioning event. In other embodiments, device 100 may project an interface onto one of the regions segmented above (e.g., via projector 110), and await a confirmation interface input to the interface (e.g., as described in further detail below). In yet another embodiment, device 100 may shine a light or laser onto one of the regions and await an input event from the user (e.g., an audio input received via microphone 160). Moreover, device 100 may identify a region associated with an object by finding the closet region (by depth values)

having a surface area greater than some threshold, and/or having normal vectors within a predefined range. Determining a region associated with the object to dimension may include any such input event consistent with the embodiments described below.

Process 600 may include determining the object to dimension based on an identified region (step 610). In some aspects, this step may include determining whether one or more regions adjacent to the specified region from step 608 are likely part of the same object. Device 100 may determine whether the object likely includes one or more other regions by iteratively analyzing each adjacent region and assessing whether its features indicates a likelihood (e.g., over some threshold value) that the region is part of the same object. In certain embodiments, this analysis may include comparing pixel colors in the adjacent region to those of the specified region and determining whether the colors are consistent in a systematic way (e.g., containing similar colors but appearing darker or lighter due to ambient lighting, etc.) For example, the side of a package may appear darker than the top due to light shining from above, but the side may contain a similar color profile as the top, indicating that the regions are related. Comparing colors between regions may be done on an average basis (e.g., whether the average pixel color in the adjacent region is similar to the average pixel color in the specified region by way of darkness or brightness), on a percentage/histogram basis (e.g., whether two regions have approximately equal numbers of certain colors, differing only by darkness or brightness levels, etc.), or any other type of statistical basis.

In addition, device 100 may determine that adjacent regions comprise the same object based on the depth values of their pixels. In some aspects, two regions may comprise the same object when pixels along an edge joining them have substantially continuous depth values. For example, device 100 may pair off the closest pixels from adjacent regions along their joining edge and compare the depth values for the paired pixels. Device 100 may consider two pixels continuous when their depths are equal or are within a certain range of each other. In some embodiments, some pixels may be paired twice (e.g., to accommodate edges having a curvature). After iterating over each pixel pair, device 100 may consider the two regions as comprising the same object when a certain percentage of pixel pairs are continuous (e.g., the percentage of continuous pixel pairs to all pairs exceeds a threshold such as 85 percent). As described above, device 100 may also make this determination based on the average pixel values in each region (e.g., when the average depths of the regions are within a threshold value) or other type of statistical analysis.

In some embodiments, when device 100 determines that two regions are part of the same object, the device may perform the above analysis to adjacent regions of the newly included region and begin the process anew. When device 100 determines that two regions are not connected (e.g., not part of the same object), the device 100 may continue onto the next adjacent region. Device 100 may use this procedure to crawl over neighboring regions, creating a boundary of regions comprising the object. In this manner, device 100 may determine every region in a field of view associated with an object.

In certain aspects, process 600 may include generating a three-dimensional representation of the object created from the related regions (step 612). Device 100 may generate a three dimensional representation of the object using, for instance, the processes described in connection with FIGS. 5A and 5B. For example, device 100 may determine each pixel in the group of related regions to be a separate point making up the object. In another example, device 100 may consider only the pixels lying on the edge or corner of these regions to constitute part of the object (e.g., as points of the object). Additionally or alternatively, device 100 may compare the generated representation to stored models, generate one or more invisible vertices based on symmetry assumptions, or similar processes described above to generate the representation of the object.

Process 600 may include determining the dimensions and other properties of the object based on its representation (step 614). Device 100 may determine the dimensions of an object (e.g., its extents, volume, etc.) using the processes described in connection with FIGS. 5A and 5B. For example, using each of the points or pixels associated with the object representation, device 100 may partition the object into groups of points or pixels, determine the volume for each group, and sum the result to estimate the volume of the object. Device 100 may use similar methods to determine the boundaries, surface area, normal vectors, etc. of the object consistent with the disclosed embodiments.

In some embodiments, process 600 may include transmitting the dimension information to an external computing system (step 616). Device 100 may transmit this information via a communications interface (e.g., communications interface 224) to conduct further processing consistent with the disclosed embodiments. For example, device 100 may transmit the dimension information to system 312 via communications network 320. In some aspects, device 100 may determine whether to transmit the dimension information based on the available communications networks (e.g., as described in connection with FIG. 10), as a matter of course, never, etc.

In certain embodiments, device 100 may store the dimension information locally in addition to or in lieu of transmitting it to an external system. Device 100 may also use the stored dimension information (e.g., volume, normal vectors, etc.) to conduct further processing consistent with the disclosed embodiments. In one example, for instance, device 100 may determine whether the object will fit inside another object such as a container given the volume of the container, the available space within the container, etc. Device 100 may then conduct further processing, such as subtracting the volume of the object from the available space of the container upon determining that the object will fit within the available space of the container.

In addition to dimensioning objects, device 100 may interact with its environment in other ways. FIG. 7A depicts an example interactive interface 704 projected onto a surface 702 consistent with the disclosed embodiments. Device 100 may project information onto a surface via projector 110 (e.g., based on signals received from processor 202). In certain aspects, the projected information may comprise or represent an interface. The interface may consist of any combination of text, images, videos, glyphs, buttons, models, symbols, graphs, charts, keyboards, number pads, application windows (e.g., windows associated with iOS, Microsoft Windows, Google Android, a proprietary window associated with device 100, etc.), or any other visual cue capable of providing information and/or receiving input. In the exemplary interface depicted in FIG. 7A, for instance, the interface 704 comprises a number pad.

In certain embodiments, the nature, content, extent, format, and properties of the interface 704 may depend on the function or processes the device is currently performing. For example, if the user delivers input to device 100 consistent with initiating a phone call, device 100 may project a number pad, address list, call options (e.g., speakerphone, mute, etc.), and so forth. In another embodiment, if the user delivers input consistent with capturing a signature, device 100 may project a blank signature line. In yet another embodiment, device 100 may project an interface containing a confirmation button or field to elicit a confirmation from a user (e.g., to conduct or terminate certain processes such as indicating an object or region to dimension as in FIG. 6). The types, configurations, and nature of the interfaces consistent with device 100 will be apparent to those skilled in the art upon consideration and practice of the disclosed embodiments.

Device 100 may project the interface 704 via projector 110 onto any suitable surface 702 capable of meaningfully conveying the information contained in the interface. In some aspects, the surface 702 may include a screen, wall, table, box, human body part (e.g., an arm, hand, etc.), held surface (e.g., a notepad, paper, book, etc.), vehicle, floor, mirror, window, a combination of these surfaces, and the like. For example, in FIG. 7A, the user's hand acts as the surface 702 on which the device projects the number pad interface 704.

In some embodiments, device 100 may determine the size, three-dimensional orientation, color, reflectance, brightness, and other surface properties of an intended surface 702. For example, device 100 may determine the orientation and color of the surface 702 and its surroundings via depth camera 130, processor 202, and the processes described in connection with FIGS. 5A, 5B, and 6. Device 100 may format the projected interface based on these surface properties (e.g., via software executed on processor 202). For example, device 100 may use the surface properties to project an interface onto the surface 702 with proper alignment (e.g., based a normal vector to the surface), appropriate sizing (e.g., within the boundary of the surface), optimal presentation parameters (e.g., contrast, coloring, saturation, exposure, sharpness, brightness, etc. of the interface based on the color of the surface), and the like. By way of example, device 100 may determine that the intended surface 702 is a dark surface in a dim room (e.g., based on the pixel color of the surface and its surroundings) with a particular orientation. In this example, device 100 may generate and project an interface with dim, white buttons, appropriately sized and oriented so that the interface appears on the surface with, e.g., a rectangular shape. In another example, device 100 may determine whether the user is wearing a glove (e.g., consistent with the embodiments disclosed in connection with interpreting inputs to a projected interface), and adjust the format of the projected interface. For instance, in one aspect, device 100 may increase the size of a projected interface (or icon, buttons, and/or fields located therein) and adjust the color of the projected interface (e.g., to optimize contrast) based on the size, color, and other properties of a worn glove.

In other embodiments, a user may specify or predefine the values, limits, ranges, and/or preferences for some or all of these interface attributes. For example, a user may specify that an interface should not exceed a certain size, should contain a certain color (e.g., for colorblind individuals), or the like. These preferences may be stored in memory on device 100. In some aspects, the user may define these customer specifications via any input method consistent with the disclosed embodiments. For example, in one embodiment, a user may specify the size of an interface by performing a particular gesture (described below) on the surface 702.

In certain embodiments, device 100 may receive, obtain, and process input delivered to the projected interface 704 through an input event comprising an interface input. In some embodiments, an interface input may include a user's interaction with the interface 704 with her body (e.g., physically touching the interface with one or more fingers), a user's interaction with the interface with a stylus or other object, or any other input method consistent with the disclosed embodiments. For example, as depicted in FIG. 7A, user 302 is delivering interface input to the exemplary interface 704 by touching the projected interface with his hand. In this way, device 100 may provide or receive information to and from a user 302 without direct physical manipulation of the device (e.g., via a user's interaction with a projected interface 704 and not device 100).

In some aspects, device 100 may recognize, detect, and interpret an interface input using depth camera 130, microphone 160, bioacoustics sensor 170, and other components of device 100 (e.g., software executed by device processors 202). In one embodiment, for instance, depth camera 130 determine the depth of the projected interface 704 (e.g., as disclosed above) and interpret a user's interaction with the interface to facilitate, conduct, initiate, or terminate processes consistent with the disclosed embodiments. For example, in the interface depicted in FIG. 7A, depth camera 130 may recognize when the user presses his finger against his hand (e.g., surface 702) in the area associated with a particular number icon of interface 704, interpret the action as the user "selecting" the number, and provide the necessary processing. In some aspects, device 100 may conduct similar processes with interface keyboards (e.g., typing), input fields, buttons, user interfaces, application windows, and other kinds of interfaces consistent with the disclosed embodiments. In some embodiments, device 100 may interpret a user's input (e.g., pressing virtual keys, opening/closing windows, typing, etc.) in any manner known to one of skill in the art.

Device 100 may detect an interaction with the interface 704 by comparing the depth and location of the interface component with that of the user's finger (e.g., via software executed by processor 202). In certain aspects, when the tip of a user's finger has a depth value within a certain threshold of the surface 702, the device 100 may interpret this action as "selecting" or "clicking" the interface 704 at the current location of the user's fingertip. Device 100 may detect the location of a user's fingertip using depth camera 130 and performing object recognition techniques consistent with the disclosed embodiments (e.g., computing a derivative depth map of the field and identifying a region having known similarities to a human hand). In this way, device 100 may detect when a user 302 has provided an interface input to interface 704 projected onto surface 702.

In another example, device 100 may recognize or detect an interface input by measuring a bioacoustics profile (e.g., via bioacoustics sensor 170) generated when a user presses his finger in certain places on his body or performs other bodily motions, and interpret the input accordingly. For example, in one aspect, device 100 may project an interface 704 onto a user's arm via projector 110. In this embodiment, the device 100 may detect an interface input by comparing the bioacoustics profile generated when the user touches portions of his or her arm against general or user-specific bioacoustics baseline data (e.g., via software executed via processor 202). In some aspects, the baseline data may represent one or more bioacoustics profiles corresponding to certain user actions (e.g., touching different portions of a user's arm, hands, or other bodily movements, etc.). Further, device 100 may verify a user's interface input by combining depth-sensing and bioacoustics readings together (e.g., via software interpreting signals from depth camera 130 and bioacoustics sensor 170), comparing the results of both measures, and determining the most likely input based on fidelity testing (e.g., one or both measures indicate a particular input with a degree of confidence exceeding a threshold). Certain exemplary methods for detecting and recognizing user input via depth cameras and bioacoustics sensors are described respectively in Harrison et al., *Omnitouch: Wearable Multitouch Interaction Everywhere* (2011) and Harrison et al., *Skinput: Appropriating the Body as an Input Surface* (2010), the contents and references of which are herein incorporated by reference in their entirety.

Device 100 may receive, obtain, and process input from a user 302 without using an interface 704. In some aspects, device 100 may monitor the environment for an input event comprising a gesture input via depth camera 130, bioacoustics sensor 170, or other device component operating in communication with processor 202. Gesture input may include any bodily movement, motion, or signal. For example, device 100 may monitor the environment for gestures such as a user's pinch-to-zoom motion; a swipe of the finger or hand; certain hand shapes or configurations (e.g., an "L," fist, etc.); hand motions (e.g., a punch); moving certain fingers in a particular way; making motions with both hands; touching certain areas of a user's body (e.g., portions of the arm, chest, head, etc.) or other objects (e.g., surface 702); any combination of similar gestures (e.g., pinch-to-zoom and pressing an area on the user's thigh with different hands); and so on.

In some aspects, a gesture input may comprise any of these actions performed on or over a surface 702 on which an interface 704 is not projected. For example, device 100 may recognize when a user makes a pinch-to-zoom motion over a nearby surface, taps a surface a predetermined number of times, places a hand on a service, etc. using depth camera 130 and/or bioacoustic sensors 170. In this way, device 100 and its components may recognize a gesture input in the same manner as recognizing an interface input (e.g., tracking finger movements in relation to surface depths), but without the need projecting an interface. In certain aspects, device 100 may initiate processes, project interfaces for input, and perform disclosed embodiments upon detecting a user's gesture input (e.g., initiating dimensioning processes of FIGS. 5A, 5B, and 6, scanning processes of FIG. 8, etc.).

Figure 7B:
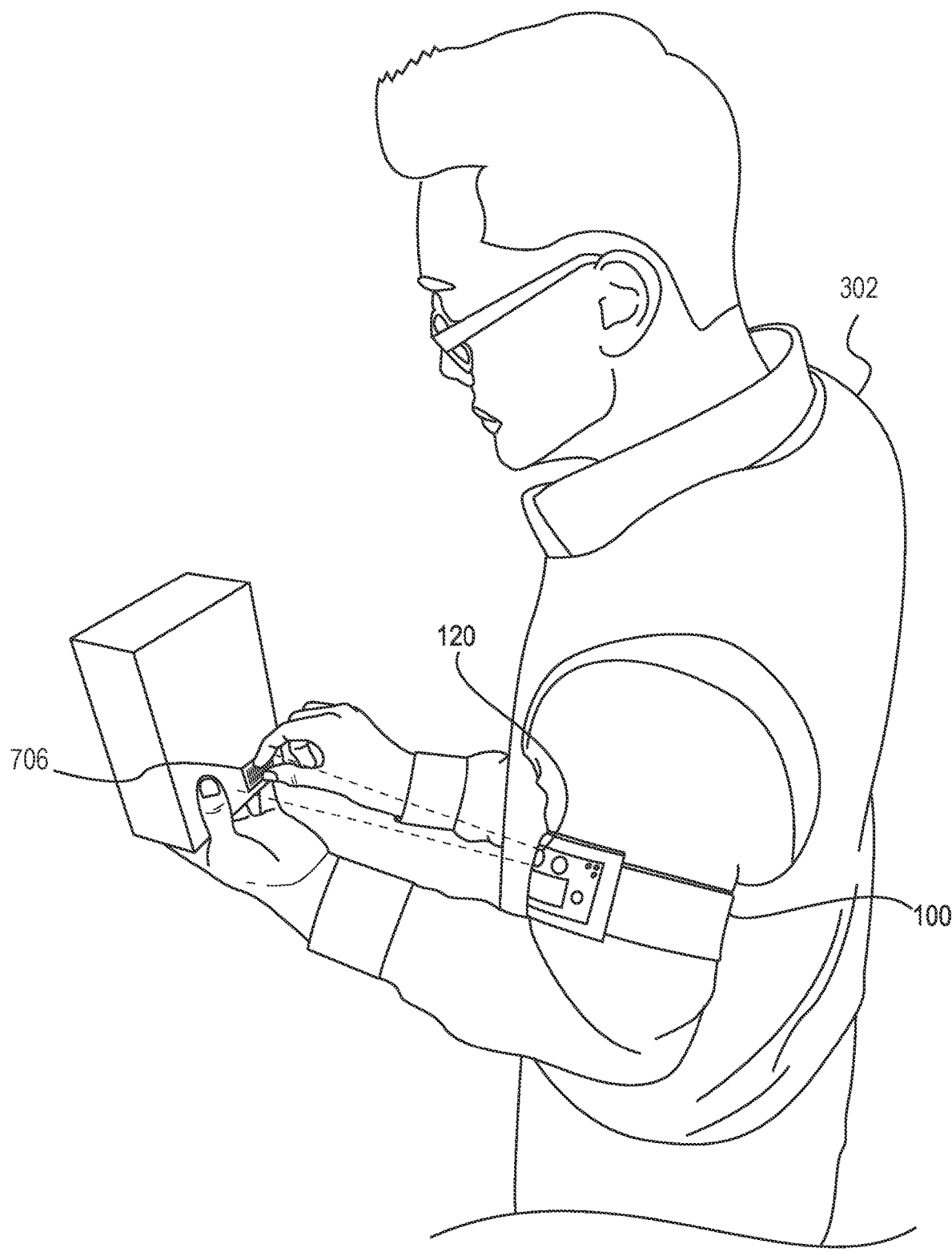
FIG. 7B depicts an example device obtaining information from a visual code consistent with the disclosed embodiments.

In some embodiments, recognized gesture inputs may be predefined. In these aspects, device 100 may recognize only particular gestures (or a class of gestures) to perform certain functions. For example, as depicted in FIG. 7B, device 100 may scan a visual code 706 on a surface 702 (e.g., via scanner 120) only when the user makes a pinch-to-zoom or swiping motion on or over the barcode or area including the barcode with her hand, tapping the surface a certain number of times, etc. In some aspects, device 100 may associate different gesture input with different device functions. For example, device 100 may associate a first type of gesture input (e.g., tapping the surface of an object a certain number of times) with a first device function (e.g., dimensioning an object) and a second gesture input (e.g., making a pinch-to-zoom motion) with a second device function (e.g., scanning a visual code 706).

In addition, users may also create their own custom gestures for conducting processes with device 100. In these aspects, device 100 may include a calibration process in order to baseline, learn, and recognize a user's custom gestures. For example, if a user wishes to initiate a particular device function by pressing a spot on his arm, device 100 may request the user to perform the custom gesture a number of times, collect the necessary gesture calibration data (e.g., via depth camera 130, bioacoustics sensor 170, etc.), and associate the custom gesture with the user and a particular device function. In certain aspects, device 100 may store this data as calibration data within memory. In some embodiments, device 100 may store custom gesture information for more than one user, allowing multiple users to create custom gestures on a single device.

In certain aspects, device 100 may receive and process input events comprising audio inputs via microphone 160 to initiate, conduct, and terminate processes disclosed herein. An audio input may include any audial, vocal, or tonal signal or command making an audible sound or noise recognizable by microphone 160 and accompanying software. For example, device 100 may conduct certain processes (e.g., scanning barcodes, taking pictures, modeling three-dimensional environments, etc.) upon sensing a vocal command from the user. In some aspects, the vocal command may relate to the process the user wishes to conduct (e.g., "scan," "read barcode," "take a picture," etc.), detected using voice recognition software executed by processor 202. In some aspects, the audio inputs may be predefined. In other aspects, the audio input may be designated and custom-defined by the user in the same manner as other input methods (e.g., gesture customization). In some embodiments, device 100 may account for variations in perceived audio inputs based on recognized languages, accents, dialects, etc., as well as a user's personal manner of speaking (e.g., by learning the user's speaking habits over time).

Device 100 may adjust its detection of input events (e.g., interface inputs, gesture inputs, audio inputs, etc.) based on one or more calibration parameters. In some aspects, the calibration parameters may refine how device 100 interprets input from a particular user. For example, the calibration parameters may correspond to personal attributes of a user (e.g., body type, size, shape, voice pitch, other body attributes, etc.), the intended use of the device (e.g., how and where the device will be used), actual use of the device from the user in the field (e.g., the user consistently clicks to the left of the intended interface button, etc.), the user's specified custom settings (e.g., custom gestures, audio commands, etc.), and the like. In one aspect, device 100 may collect some of these calibration parameters as part of an initial calibration process. For example, device 100 may require a user to interact with a calibration interface projected onto a surface (e.g., an arm) in order to determine certain calibration parameters associated with a user. In another example, device 100 may collect and monitor calibration parameters as the user interacts with the device (e.g., by touching surfaces, delivering various audio commands and gestures, etc.). In some embodiments, device 100 may store calibration parameters associated with one or more users in memory so that multiple users may be calibrated on a single device.

As depicted in FIG. 7B, device 100 may scan and decode visual codes using scanner 120 operating in connection with one or more processors 202. In this exemplary embodiment, device 100 is configured to scan visual codes 706 located on an object. In certain aspects, the visual code 706 may include any linear or matrix barcode known to one of ordinary skill in the art (QR, UPC, EAN, MSI, Intelligent Mail, ShotCode, DataGlyphs, EZcode, etc.). The visual code 706 may reside on any object. For example, device 100 may be configured to scan bar codes on boxes, packages, mailing slips, products, envelopes, cards, papers, flyers, etc. In certain embodiments, device 100 may decode and process the information encoded in the visual code 706 for use in methods consistent with the disclosed embodiments. For example, in one aspect, device 100 may store information associated with the scanned visual code 706 (e.g., in memory), transmit the information to other computer systems for further processing, receive additional information In response to scanning the barcode, and the like.

In the exemplary embodiment of FIG. 7B, device 100 may scan a visual code 706 within its field of view, e.g., via scanner 120, in response to an interface input, device input, audio input, gesture input, or any other kind of input disclosed herein. For example, in one embodiment, processor 202 may send a signal to scanner 120 to scan a visual code 706 in response to detecting a user's pinch-to-zoom gesture on or near the barcode, a gesture indicating the desired scan area, a vocal command, the user's selecting a "scan" button on a projected interface, and the like (e.g., based on signals detected from depth camera 130, etc.).

Figure 8:
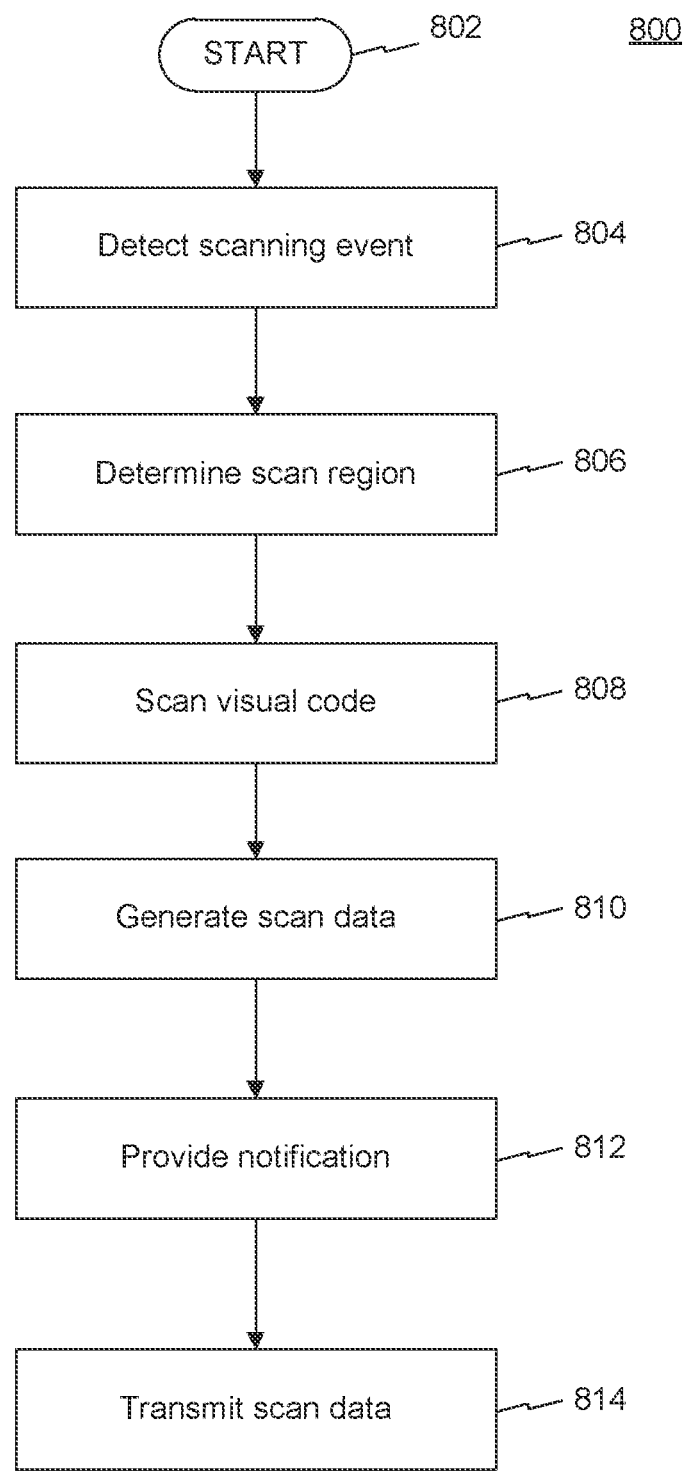
FIG. 8 depicts a flowchart of an example process for scanning visual codes consistent with the disclosed embodiments.

FIG. 8 depicts a flowchart of an example process 800 for scanning visual codes consistent with the disclosed embodiments. Process 800 may be implemented via hardware and/or software executed in device 100, such as a depth camera 130 and scanner 120 communicatively connected (e.g., via backbone 206 or other circuitry) to a processor 202 executing software instructions, in addition to other device components. Further, process 800 may be implemented in whole or in part on other computing systems, such as system 312 in communication with device 100 over communications network 320. Process 800 or its subroutines may be implemented as a standalone process or in connection with other processes consistent with the disclosed embodiments (e.g., signature capturing processes associated with FIG. 9, object dimensioning processes, etc.).

Process 800 may begin (step 802) by detecting a scanning event (step 804). In some aspects, a scanning event may comprise any type of input event consistent with the disclosed embodiments, such as a gesture input, interface input, etc. For example, device 100 may detect a scanning event via depth camera 130 when the user 302 makes a pinch-to-zoom motion on, over, or close to a surface 702 containing a visual code 706. As explained above, the scanning event may comprise other input events, such as audio inputs or a user's custom gestures. Moreover, in some aspects, device 100 may continually monitor for visual codes with or without detecting a scanning event.

In some aspects, process 800 may include determining a scan region in response to detecting the scanning event (step 806). The scan region may reflect an area over which device 100 may attempt to scan a visual code 706 (e.g., by angling or orientating scanner 120 in that direction using a rotatable coupling). In some aspects, the scan region may be based on the location of the scanning event. For example, in one embodiment, device 100 may determine the size and location of the scan region given the depth and extent of the user's pinch-to-zoom motion. In this example, the depth of the surface or the user's hand and the extent of the motion may include the range of the scan region. In another example, the scan region may include a circular, elliptical, or rectangular area having a center at the location (e.g., depth and position) of the scanning event. In such embodiments, device 100 may determine the bounds of the scan region to be sufficiently large (e.g., given the depth of the surface), to scan most visual codes 706, such as a circle or square having a diameter or side length of several inches (e.g., six inches, eight inches, etc.). Device 100 may determine the scan region in other ways. For example, in one embodiment, device 100 may determine the scan region to include the entirety of the nearest surface having a surface area above a threshold size (e.g., as computed in connection with FIGS. 5A and 5B) and/or located within some geographic region (e.g., within some depth and position boundary). Additionally or alternatively, device 100 may determine the scan region to include a surface having a normal vector within an appropriate range (e.g., to favor surfaces facing the device). In another embodiment, the scan region may include the center of the field of view of depth camera 130. In still other aspects, device 100 may not determine a specific scan region and may instead use a default scan region (e.g., the area directly in front of the scanner 120).

Process 800 may include scanning the visual code 706 with scanner 120 (step 808). In some embodiments, for example, processor 202 may provide a signal to scanner 120 to scan and decode a visual code 706 within the scan region determined in step 806. Upon receiving the signal, scanner 120 may image an area containing the scan region in an attempt to decode the visual code 706. In other aspects (e.g., where there is not a scan region), scanner 120 may attempt to image an area directly in front of it. In some embodiments, device 100 may project a linear or area guiding beam, pulse, projected interface, etc. onto the surface 702 during this process, indicating to user 302 the extent of the scan region it is attempting to image with scanner 120. Device 100 may produce this guiding means through device components such as scanner 120 (e.g., as part of the imaging process), projector 110, a dedicated light or laser output communicatively connected to processor 202 or other device component, etc.

In some aspects, process 800 may generate scan data in response to successfully decoding and processing visual code 706 (step 810). Device 100 may generate the scan data through software instructions executed by processor 202 using any known or proprietary method. Moreover, the format and use of the scan data generated in response to a successful scan may take many forms. For example, in one embodiment, a user 302 may scan a visual code 706 on a package to indicate its arrival or departure at a particular storage or routing location, and route this information accordingly (e.g., transmit it to system 312). In another example, the scan data may reflect a confirmation that a customer has signed for a package, is about to sign for a package (e.g., to initiate signing processes described in connection with FIG. 9), did not sign for a package, etc. In still other embodiments, the scan data may include information about an object on which the visual code 706 is placed (e.g., product information, pricing information, availability information, user reviews, etc.), create an instruction to determine such information from another computer system (e.g., system 312 or 332), and so on. The possible uses and formats of data created in response to scanning a visual code 706 will be readily appreciated by one of ordinary skill in the art.

Process 800 may include providing a notification indicating that the scan of the visual code 706 and/or generation of the scan data were successful (step 812). In some aspects, this notification may affect the immediate surroundings of device 100. For example, in response to successfully decoding and/or processing a visual code 706, device 100 may emit a tone via a speaker 150, project an interface through projector 110 (e.g., onto the surface 702 on which the visual code 706 resides) with an appropriate confirmation message or color, display a confirmation message or indication on display 140, provide haptic feedback through a vibration motor, and so on. Additionally or alternatively, device 100 may provide a notification to other systems such as system 312, or a customer 330 associated with a computing system 332. In these embodiments, the notification make take the form of an SMS text message, e-mail message, automated voice message, push notification, data file, process instruction, etc.

In some embodiments, process 800 may include transmitting the scan data or other information to one or more computing systems (step 814). In certain aspects, these computing systems (e.g., systems 312, 332, etc.) may process the information to conduct further processing consistent with the disclosed embodiments. For example, device 100 may transmit the scan data or other information to a host system 312, such as a web server hosted by host 310, to update one or more records maintained by the system. System 312 may then update one or more webpages, mobile applications, or other applications containing information associated with the visual code 706 and/or its corresponding package (e.g., package tracking information). In some embodiments, device 100 may receive an indication from system 312 that such records have been updated (e.g., over communications network 320), and provide a notification message, tone, vibration, display, etc., as described above. Device 100 may transmit the scan data to an external computing system using any process consistent with the disclosed embodiments (e.g., as described in connection with FIGS. 3 and/or 10). In addition, device 100 may store and/or process the scan data locally and update the one or more records itself (e.g., via local files, transmitting updated records information to an external computing system, etc.).

In addition, device 100 may receive other information from system 312 or third party system 332 in response to providing scan data from visual code 706. For example, device 100 may receive an alert from system 312 or 332 representing that the scan data has triggered an alert condition. In certain embodiments, an alert condition may reflect any state of facts warranting an alert, such as the user 302 scanning an incorrect package (e.g., based on the recipient, address as compared with a current GPS location, etc.), indicating additional packages should be delivered to that address, a confirmation that the package has been scanned at a particular time or place, all packages for that address have been scanned, etc. In some aspects, device 100 may be configured to display the alert or notify the user of the alert upon receiving the information from the external system (e.g., projecting a message using projector 110, displaying the message on display 140, making a sound via speaker 150, providing haptic feedback through a vibration motor, and so on). In addition, device 100 may determine whether the scan data indicates triggers an alert condition through local software executed by processor 202 based on stored data and alert conditions.

Figure 9:
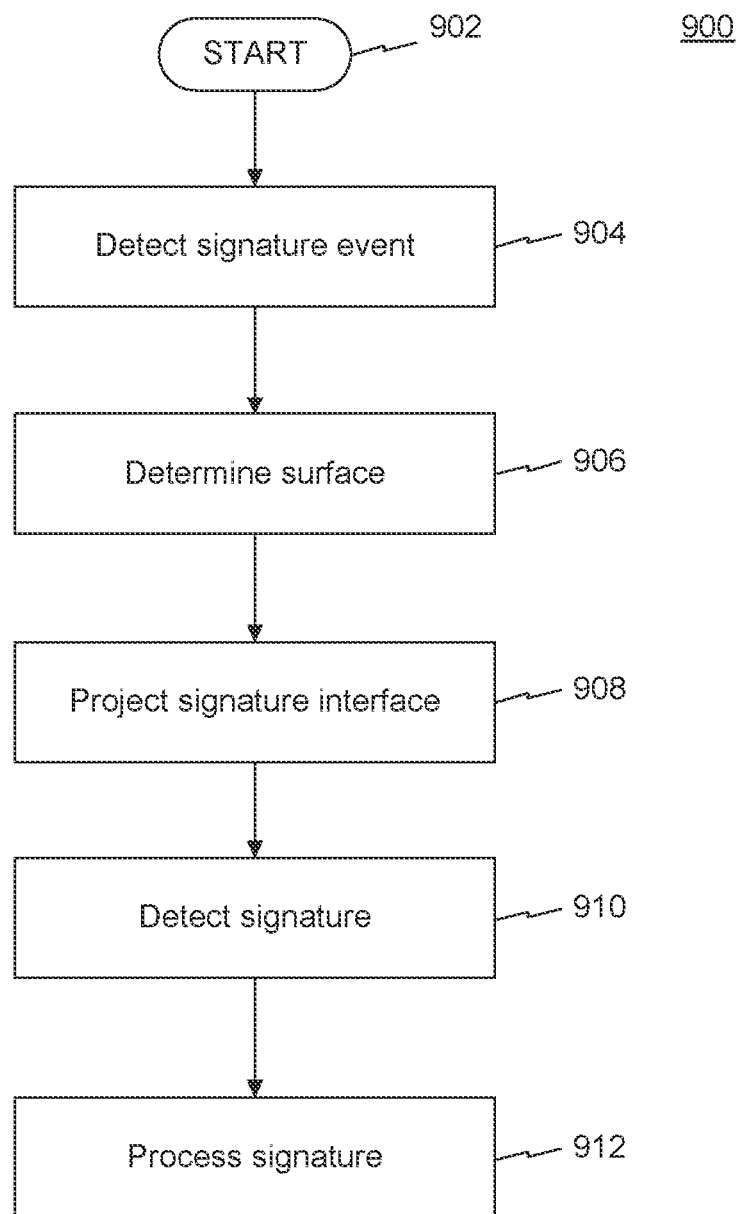
FIG. 9 depicts a flowchart of an example process for processing signatures consistent with the disclosed embodiments.

FIG. 9 depicts a flowchart of an example process 900 for processing signatures consistent with the disclosed embodiments. Process 900 may be implemented via hardware and/or software executed in device 100, such as a depth camera 130 and projector 100 communicatively connected (e.g., via backbone 206 or other circuitry) to a processor 202 executing software instructions, in addition to other device components. Further, process 900 may be implemented in whole or in part on other computing systems, such as system 312 in communication with device 100 over communications network 320. Process 900 or its subroutines may be implemented as a standalone process or in connection with other processes consistent with the disclosed embodiments (e.g., the visual code scanning processes of FIG. 8, etc.).

Process 900 begins (step 902) by detecting a signature event (step 904). In some aspects, a signature event may reflect a signal for device 100 to project a signature interface onto a surface (e.g., surface 702). A signature event may comprise any type of input event consistent with the disclosed embodiments. In some aspects, for example, a signature event may comprise an input event such as a gesture input (e.g., detecting that user 302 has tapped the surface of an object a certain number of times, and audio input, etc.). In addition, a signature event may arise automatically in connection with other processes, such as in response to successfully scanning a visual code 706, generating scan data, transmitting scan data, receiving a signal from an external computing system, etc.

Process 900 may include determining a signature surface (e.g., surface 702) on which to project the signature interface (step 906). In some aspects, device 100 may determine the signature surface based on the signature event. For example, if the signature event comprises an indication that device 100 has scanned a visual code 706, device 100 may determine the signature interface to include the surface 702 on which the code resides (e.g., using the processes described above). In addition, if the signature event comprises a gesture input, device 100 may determine the signature interface to comprise the surface 702 closest to the gesture input having a surface area above a threshold, within a predetermined depth/location range, and/or having a normal vector within an appropriate range (e.g., to favor face-on surfaces over edge-on surfaces). Device 100 may determine these values consistent with the disclosed embodiments. In other aspects, device 100 may determine an appropriate signature interface based additional input events from the user. For example, after detecting a signature event, device 100 may monitor for a particular gesture input via depth camera 130. When device 100 senses the particular gesture input from the user 302, device 100 may determine the surface 702 nearest to the gesture input as the signature surface. In addition, device 100 may apply the surface area, depth range, and normal vector orientation thresholds as described above. Device 100 may determine signature surfaces in other ways, and the listing of certain processes above is for exemplary purposes only. For example, device 100 may determine the closest surface 702 having an appropriate area, depth range, and orientation to be the signature interface regardless of any input event. In another example, the signature interface may include any surface directly in the trajectory of projector 110, etc.

Process 900 may include projecting a signature interface into the signature surface to await further input (step 908). Device 100 may project the signature interface onto surface 702 using projector 110 in communication with processor 202. In some aspects, the signature interface may be appropriately sized an oriented using the processes described above for depth camera 130, and may contain any type of information consistent with the disclosed embodiments. For example, in some aspects, the signature interface may include a blank area without any markings, designated only by a lit region of a rectangular, ovular, or circular shape. In other aspects, the signature interface may include a blank signature line with other markings such as an "X" near the signature line, text displaying the signor's name (e.g., determined from scan data generated from visual code 706 or information received via system 312), or other such information. The signature interface may include any other kinds of information consistent with the disclosed embodiments. For example, in one embodiment, the signature interface may include a confirmation button so that the individual providing input to the interface may indicate the completion of a signature by depressing the projected button.

Process 900 may monitor for and detect interface input provided to the signature interface (step 910). Device 900 may monitor for and detect the interface input using any of the processes described above (e.g., as described in connection with FIGS. 7A and 7B). For example, device 900 may detect an interface input reflecting the signor's signature using depth camera 130 and other device components (e.g., processor 202). Device 100 may capture the signature by detecting the motion of the signor's hand or stylus in a similar fashion to monitoring other interface inputs (e.g., comparing the depth of the finger/stylus to that of signature surface with depth camera 130, etc.). For example, device 100 may interpret the signor's finger path having depth values within a threshold range of the signature surface as the signature. In some embodiments, device 100 may determine that the signor has completed providing input to (e.g., signing) the signature interface. This determination may be based on, for example, detecting that the signor has reached the end of a projected signature line, detecting an interface input (e.g., delivered to a confirmation button projected on the interface) signifying completion of the signature, or any other type of input event (e.g., a gesture input or audio input) consistent with the disclosed embodiments.

In certain embodiments, process 900 may include processing the captured signature (step 912). In some aspects, processing the captured signature may include generating and storing data associated with the captured signature in memory (e.g., as an image or other data file, etc.). Device 100 may also generate signature information associated with the signature and transmit that information to an external system (e.g., system 312) over communications network 320 to conduct additional processing. For example, device 100 may transmit signature data to system 312 to update one or more stored records (e.g., tracking information) managed by the system, as explained above. In some aspects, these records may be available over websites, mobile applications, or other applications hosted by system 312. In some embodiments, device 100 may receive an indication from system 312 that these records have been updated (e.g., over communications network 320). Processing the captured signature may include conducting further processing consistent with the disclosed embodiments (e.g., sending confirmations messages, monitoring for additional input events, etc.).

Figure 10:
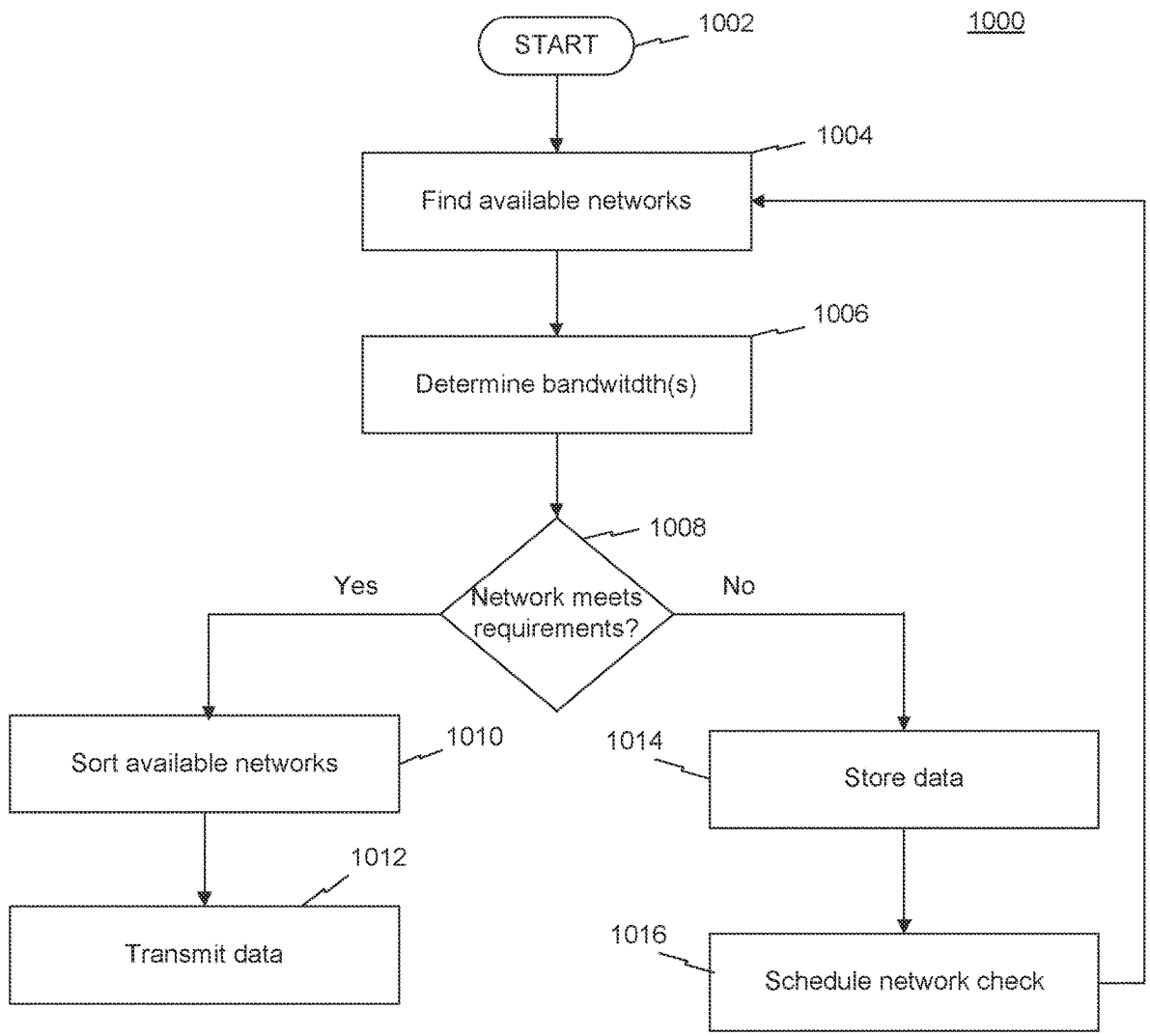
FIG. 10 depicts a flowchart of an example process for transmitting data among network devices consistent with the disclosed embodiments.

FIG. 10 depicts a flowchart of an example process 1000 for transmitting data among network devices consistent with the disclosed embodiments. Process 1000 may be implemented via hardware and/or software executed in device 100, such as a communications interface 224 communicatively connected (e.g., via backbone 206 or other circuitry) to a processor 202 executing software instructions, in addition to other device components. Further, process 1000 may be implemented in whole or in part on other computing systems, such as system 312 in communication with device 100 over communications network 320. Process 1000 or its subroutines may be implemented as a standalone process or in connection with other processes consistent with the disclosed embodiments (e.g., scanning visual codes, dimensioning objects, capturing signatures, etc.).

Process 1000 may begin (step 1002) by determining whether one or more communications networks are available to device 100 (step 1004). Device 100 may determine whether networks are available via signals from communications interface 224, which may in turn be based on signals received via channel 228 and/or backbone 206. Using these signals, device 100 may be able to determine whether any communication network consistent with the disclosed embodiments is currently available. For example, device 100 may determine whether one or more cellular networks, WiFi networks, public switched telephone networks, LANs, etc., are available for the device to transmit information. In certain embodiments, this determination may also include determining whether the device has access to transfer information over the available network (e.g., has a password for an encrypted WiFi signal, etc.). In some aspects, device 100 may consider as unavailable those networks to which the device does not have access privileges, even if the network is otherwise in range. When a network is in range but deemed unavailable, device 100 may prompt a user 302 to view, select, and input passwords to obtain access to the network using the foregoing embodiments (e.g., via projected interfaces, touchscreen displays, etc.).

In some aspects, process 1000 may include determining the available bandwidth and other properties of the available networks (step 1006). These properties may reflect the speed, reliability, strength, security, energy consumption, etc. of the available networks. For example, in one embodiment, device 100 may determine the current or historical bandwidth associated with a particular network, the strength of its signal, and a degree of security associated with the network (e.g., based on whether the network is encrypted, the specific type encryption algorithm used, etc.). In some aspects, device 100 may also determine whether it has used the network before and assess its previous use with the network (e.g., bandwidths, latencies, whether the communications were successful, etc.). In certain aspects, device 100 may generate a network score for each available network using the above information. In one example, device 100 may score the bandwidth, signal strength, and security features of a given network on a scale of 0.0 to 1.0 and sum or multiply the three component scores to generate a network score for the network. The network score may also incorporate other types of information, such as the network's energy consumption, latency, stability, quality of service, rate of communication, etc.

Process 1000 may include determining whether one or more of the available networks meet certain threshold requirements (step 1008). For example, device 100 may determine whether any of the available networks have a network score above a particular threshold (e.g., 0.7, 2.5, etc.), and/or whether they have a bandwidth in excess of another threshold (e.g., 100 kbps, 1 Mbps, etc.). In certain embodiments, device 100 may assess other kinds of connection parameters in step 1008, such as network security levels, or any other network parameter disclosed herein. Moreover, step 1008 may involve several such tests, such as measuring the available networks' bandwidth and security scores against separate thresholds.

If one or more networks satisfy the requirements of step 1008, device 100 may sort or rank those networks to determine the best or apparent best network to use for data transmission (step 1010). In some aspects, device 100 may rank the networks by network score, bandwidth, energy consumption, or any other network parameter consistent with the disclosed embodiments. For example, device 100 may select the network having the highest security score, bandwidth, or network score to use for transmitting information to system 312. In some aspects, the parameter for ranking networks in step 1010 may be different or the same as that used in step 1008. In one example, device 100 may determine the networks having a bandwidth above some threshold in step 1008, but rank the networks by security score in step 1010.

Using the selected network (e.g., the network most highly ranked or having the highest value for the parameter of steps 1008 or 1010), device 100 may transmit data over that network. The data transmitted may take the form of any data consistent with the disclosed embodiments, such as signature information, object dimension information, scan data, etc. Device 100 may transmit the information via communications interface 224 or backbone 208 in communication with an external system 312 or 332 over the selected network. In some aspects, device 100 may transmit this information automatically without any input from user 302. In other aspects, device 100 may prompt a user whether she wishes to transmit the data and/or specify the network to use.

In some embodiments, when none of the available networks satisfy the requirements of step 1008, process 1000 may include storing the data locally in device 100 (step 1014). For example, if device 100 is attempting to transmit processed signature data and no available networks satisfy the network requirements, device 100 may store the information in a memory associated with the device (e.g., secondary memory 210). In other aspects, device 100 may save the data on local memory automatically regardless of the availability of communications networks. Device 100 may then use the stored information in processes consistent with the disclosed embodiments.

Device 100 may also schedule a network check at a future time slot when no network is available or has the necessary network parameters (step 1016). In some aspects, this network check may reflect a future time at which device 100 may determine the available networks (step 1004) in an attempt to transmit the stored data. In certain aspects, the duration of time between the current and future time slot may be based on any consideration consistent with the disclosed embodiments, such as a the importance of the information, the last known successful data transmission, the time of day, the bandwidths of the available networks, the quantity of information that must be transmitted, etc. For example, device 100 may schedule network checks more frequently as the time from the last successful data transmission grows, the quantity of information to transmit increases, etc. In certain aspects, device 100 may delete the stored information from memory when it is eventually transmitted (step 1012), although such process is not required.

In some embodiments, device 100, system 312, and/or third party system 332 may manage, host, store, and generate accounts and associated account information for one or more users (e.g., user 302) of device 100. In some aspects, user account information may include a user's custom input definitions or calibration data (e.g., custom gestures, custom audio inputs, idiosyncratic user input, etc.), user preferences (e.g., definitions corresponding to colors and sizes of interfaces, etc.), user credentials (e.g., a login, password, user ID, employee number, e-mail address, biographical information, biometric information, etc.), user attributes (e.g., parameters representing a user's body type, body size, dialect, etc.), and any other information consistent with the disclosed embodiments. In some aspects, device 100 may also associate data obtained, gathered, or processed with device components with certain users, as described above.

In some aspects, device 100, system 312, and/or third party system 332 may receive, manage, and implement user account and credential information to conduct certain processes consistent with the disclosed embodiments. For example, in one embodiment, device 100 may receive information reflecting a user's login credentials via an input event such as an interface input detected by depth camera 130 or display input received via display 140, etc. In certain aspects, device 100 may authenticate a user's credentials, determine whether the user is authorized to wear or operate the particular device 100 (e.g., based on the credentials), and provide device functionalities concomitant with the users credential information. For example, in some embodiments, device 100 may be configured to operate only for certain users, provide certain device processes (e.g., barcode scanning) only for a second set of users, and the like. In other aspects, device 100 may require no login credentials, may require only simple gesture inputs to unlock features (e.g., a swipe to unlock), may provide all its functionalities to all users. In some embodiments, user account management may take place on other computer systems, and device 100 may be configured to send and receive account information to the other systems to facilitate user account management. For example, system 312 may monitor a set of devices operating in the field and may monitor the user credentials associated with each device. Under certain circumstances, system 312 may provide a signal to device 100 via communications network 320 to disable or enable the device 100, certain functionalities associated with device 100, and so on.

Figure 11:
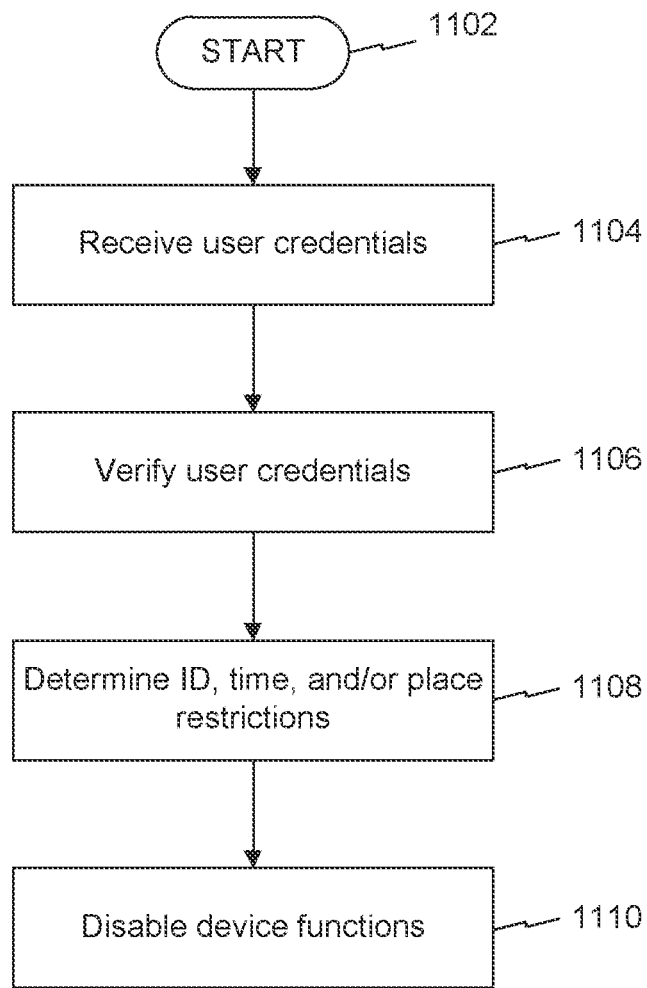
FIG. 11 depicts a flowchart of an example process for disabling device functions consistent with the disclosed embodiments.

FIG. 11 depicts a flowchart of an example process 1100 for disabling device functions consistent with the disclosed embodiments. Process 1100 may be implemented via hardware and/or software executed in device 100, such as with a processor 202 executing software instructions to communicate with one or more device components. Process 1100 may be implemented in whole or in part on other computing systems, such as system 312 in communication with device 100 over communications network 320. Process 1100 or its subroutines may be implemented as a standalone process or in connection with other processes consistent with the disclosed embodiments.

Process 1100 may begin (step 1102) by receiving user credentials from a user 302 (step 1104). As described above, user credentials may include information such as a user ID, login name, password, employee number, e-mail address, and other kinds of information identifying or uniquely identifying the user (e.g., address, biometric information). Device 100 may receive a user's credentials via any appropriate input event, such as interface inputs detected by depth camera 130 that a user provides to input fields projected by projector 110. Moreover, device 100 may receive a user's credentials via a display input received from touchscreen display 140, buttons, keyboards, or other input devices on device 100 or a device in communication with device 100 (e.g., system 312), biometric sensors located on device 100, etc. Other computing systems may also receive user credential information, such as system 312, via associated input devices (e.g., keyboards) and/or communications networks 320.

In certain aspects, process 1100 may include verifying the received credentials (step 1106). Process 1100 may authenticate a user's credentials, by, for example, comparing the received credentials to those stored in a memory and determining whether the received credentials match those in memory (e.g., using one of the inputs as a key, such as a user ID, login name, etc.). In some embodiments, process 1100 may verify a user's credentials via local processes operating on device 100 or through processes conducted on an external system in communication with device 100, such as system 312. For example, device 100 may authenticate a user's credentials locally (e.g., via processor 202 executing software instructions), or may transmit the received information to an external system (e.g., system 312) for authentication. In this latter embodiment, system 312 may authenticate user 302 itself, and then transmit the results of the authentication process to device 100 for further processing.

If the received credentials do not match those in memory (e.g., the user is not authenticated), device 100 may take a number of actions. In one aspect, device 100 or system 312 may simply prompt the user 302 to re-enter her credentials via the same or different input method as before (e.g., interface input, display input, biometric input, etc.). In another aspect, device 100 may disable the device or certain functions on the device (e.g., for a certain amount of time, until operator override, etc.). In yet another aspect, device 100 may disable certain functionalities after a certain number of failed login attempts, and so on. Device 100 may also provide more advanced authentication techniques such as prompting a user to answer security questions (e.g., to reset a password).

When the device 100 or an external system 312 authenticates a user 302, process 110 may also include determining whether the user is subject to any personal (ID), time, and/or place restrictions (step 1108). In some aspects, the ID, time, and/or place restrictions may limit or disable device functionalities for identified users during certain times within certain geographical regions. Each ID, time, and/or place restriction may apply to one or more device functions. In one illustrative embodiment, device 100 may determine that a user with a given user ID (e.g., any unique identifier used to authenticate the user based on the received credential information) may not use processes consistent with scanning visual codes between the hours of 3:00 A.M. and 6:00 A.M. while in a particular geographical region (e.g., one associated with a particular warehouse). The ID, time, and place restrictions may apply in any combination of AND/OR/NOT logical operations and groupings. For example, device 100 may disable a device function for a particular user (AND) during a specific time, (OR) for that user while (NOT) in a particular region. The ID, time, and place restrictions may be assessed periodically (e.g., every 15 minutes), on initial login, or at times when the restrictions apply or dissolve (e.g., based on an active user ID and after determining that the user is not permitted to use a device function between 6:00 P.M. to 6:00 A.M.).

In some embodiments, device 100 may determine the ID, time, and place restrictions based on local processing. For example, device 100 may authenticate a user 302 (step 1106), determine a user ID for that user based on the credential information, and determine whether that user is limited by an ID restriction, a time restriction (e.g., via an internal clock in communication with processor 202), and/or a place restriction (e.g., via a GPS receiver in communication with processor 202). Device may make this determination based on restriction information stored in memory (e.g., secondary memory 210), such as in a database or table, and look up the user in the table (e.g., based on the unique ID) to determine whether any relevant restrictions apply now or in the future. In addition, an external system such as system 312 may determine whether any relevant restrictions apply (e.g., via a database stored in data repository 316), and may communicate the results of such a determination to device 100 for further processing.

Process 1100 may also include disabling one or more features of the device 100 in accordance with the ID, time, and/or place restrictions (step 1110). In certain aspects, device 100 may disable a device function by turning off signals received from the affected device components (e.g., via an instruction from processor 202) and/or suppressing the signals in software (e.g., the processor receives the signals but does not process them as described above). The device may then turn the affected signals back on and/or withdraw the software block when the relevant restrictions no longer apply.

The device 100 may disable its functions based on the current user, time, and/or location of the device in comparison to the identified ID, time, and/or place restrictions. Device 100 may determine a current time and location of the device based on a local clock and/or GPS receiver installed in device 100. In certain aspects, the device 100 may determine whether to disable a device function periodically, when a new user logs into the device, at a particular time, or when the device enters or leaves a particular region. In some aspects, the timing of this determination may be based on the identified ID, time, and place restrictions. For example, if a user is not subject to a place restriction, then the user's movements alone may not affect the timing of determining whether to disable a device functionality. In another example, if device 100 determines that a particular device function (e.g., the dimensioning function) should be disabled at 9:00 P.M. for a current user, the device may compare the ID, time, and/or location associated with the device at 9:00 P.M. to ensure that the identified time restriction still applies. In this manner, device 100 may enable and disable its functions based on a comparison of the user's credentials, the current time, and the current place associated with the device to identification, time, and place restrictions stored in memory. In addition, the foregoing processes may take place on an external system (e.g., system 312), which may then provide an instruction to device 100 over communications network 320 to disable/enable certain functions based on the above analysis.

While certain aspects and routines of the foregoing embodiments have been described as occurring in a particular order or manner, the disclosed embodiments are not so limited. For example, the steps or subroutines of the foregoing embodiments may be rearranged, reordered, omitted, spliced, modified and/or recombined to perform additional processes consistent with those contemplated herein.

Other embodiments will be apparent to those skilled in the art from consideration of the specification and practice of the embodiments disclosed herein. For example, while some aspects of the foregoing embodiments have been described in connection with device 100 generally, those of ordinary skill in the art will appreciate that device 100 may include the necessary hardware (e.g., components, circuitry, peripherals, etc.) and/or software instructions executed via one or more processors to practice the foregoing embodiments. It is intended that the specification and examples be considered as exemplary only, with a true scope and spirit of the invention being indicated by the following claims.

What is claimed is:

1. A wearable, electronic device for performing courier services, comprising:
   a depth camera for detecting object depths in a field of view;
   a memory for storing instructions; and
   one or more processors communicatively connected to the depth camera, the one or more processors configured to execute the instructions to perform the operations of:
      detecting a dimensioning event based on a signal received from the depth camera, the dimensioning event comprising an input gesture;
      segmenting the field of view from the depth camera into a plurality of regions;
      determining a first region of the plurality of regions, the first region being associated with an object proximate to the input gesture;

determining one or more adjacent regions of the plurality of regions based on the first region, the one or more adjacent regions being associated with the object;

determining dimensions of the object in the first region and the one or more adjacent regions; and determining a volume of the object based on the determined dimensions of the object.

2. The device of claim 1, wherein segmenting the field of view further comprises:

detecting at least one of edges, corners, or features of the object in the field of view; and detecting the plurality of regions in the field of view based on the detected at least one of edges, corners, or features.

3. The device of claim 2, wherein detecting features of the object is based on at least one of threshold testing and edge thinning.

4. The device of claim 1, wherein determining one or more adjacent regions associated with the object further comprises:

determining features of the one or more adjacent regions; and determining a likelihood of a portion of the object being present in a region of the one or more adjacent regions based on the determined features of the one or more adjacent regions.

5. The device of claim 4, wherein determining the likelihood of a portion of the object present in the region further comprises:

comparing a color of at least one pixel in the region to a color of at least one pixel in the first region; and determining whether the color of the at least one pixel in the region is consistent in a systematic way with the color of the at least one pixel in the first region.

6. The device of claim 5, wherein determining whether the color of the at least one pixel is consistent in a systematic way is based on depth values of the at least one pixel in the region and the at least one pixel in the first region.

7. The device of claim 4, wherein determining the likelihood of a portion of the object being present in the region further comprises:

applying an edge detection filter to the signal received from the depth camera; and determining whether the object comprises a second region adjacent to the first region based on a comparison of a depth of a pixel within the second region to a depth of a pixel of the first region, wherein the volume of the object is further based on the second region.

8. The device of claim 1, wherein the operations further comprise:

generating a three-dimensional representation of the object based on the first region and the one or more adjacent regions associated with the object.

9. The device of claim 8, wherein generating the three-dimensional representation of the object further comprises:

determining a location of an invisible vertex of the object not detected by the depth camera, wherein the location of the invisible vertex is based on an assumed symmetry of the object, and wherein the volume is further based on the location of the invisible vertex.

10. The device of claim 8, wherein the operations further comprise:

comparing the generated three-dimensional representation of the object to one or more stored models.

11. The device of claim 1, wherein determining the volume of the object further comprises:

determining the volume subtended by at least four nonplanar points of the object.

12. The device of claim 11, wherein determining the volume subtended by the at least four nonplanar points of the object further comprises:

partitioning the object into a plurality of regions including the at least four nonplanar points;

finding the volume of the object in each region of the plurality of regions; and summing the volume of the object in the each region of the plurality of the regions.

13. A computer-implemented method for performing courier services using a wearable electronic device, the wearable electronic device comprising a depth camera for detecting object depths in a field of view, the method comprising the following operations performed by one or more processors:

detecting a dimensioning event based on a signal received from the depth camera, the dimensioning event comprising an input gesture;

segmenting the field of view from the depth camera into a plurality of regions;

determining a first region of the plurality of regions, the first region being associated with an object proximate to the input gesture;

determining one or more adjacent regions of the plurality of regions based on the first region, the one or more adjacent being associated with the object;

determining dimensions of the object in the first region and the one or more adjacent regions; and determining a volume of the object based on the determined dimensions of the object.

14. The computer-implemented method of claim 13, wherein segmenting the field of view further comprises:

detecting at least one of edges, corners, or features of the object in the field of view; and detecting the plurality of regions in the field of view based on the detected at least one of edges, corners, or features.

15. The computer-implemented method of claim 13, wherein determining one or more adjacent regions associated with the object further comprises:

determining features of the one or more adjacent regions; and determining a likelihood of a portion of the object being present in a region of the one or more adjacent regions based on the determined features of the one or more adjacent regions.

16. The computer-implemented method of claim 15, wherein determining the likelihood of a portion of the object present in the region further comprises:

comparing a color of at least one pixel in the region to a color of at least one pixel in the first region; and determining whether the color of the at least one pixel in the region are consistent in a systematic way with the color of the at least one pixel.

17. The device of claim 15, wherein determining the likelihood of a portion of the object being present in the region regions further comprises:

applying an edge detection filter to the signal received from the depth camera; and determining whether the object comprises a second region adjacent to the first region based on a comparison of a depth of a pixel within the second region to a depth of a pixel of the first region, wherein the volume of the object is further based on the second region.

18. The device of claim 13, wherein the operations further comprise:
   generating a three-dimensional representation of the object based on the first region and the one or more adjacent regions associated with the object.

19. The device of claim 18, wherein generating the three-dimensional representation of the object further comprises:
   determining a location of an invisible vertex of the object not detected by the depth camera, wherein the location of the invisible vertex is based on an assumed symmetry of the object, and wherein the volume is further based on the location of the invisible vertex.

20. The device of claim 13, wherein determining the volume of the object further comprises:
   determining the volume subtended by at least four nonplanar points of the object, wherein determining the volume subtended by four or more nonplanar points of the object comprises:
   partitioning the object into a plurality of regions including the at least four nonplanar points;
   finding the volume of the object in each region of the plurality of regions; and
   summing the volume of the object in the each region of the plurality of the regions.

* * * * *